United States Patent
Hong et al.

(10) Patent No.: US 9,042,062 B2
(45) Date of Patent: May 26, 2015

(54) MAGNETIC SENSOR WITH RECESSED AFM SHAPE ENHANCED PINNING AND SOFT MAGNETIC BIAS

(71) Applicant: HGST Netherlands B.V., Amsterdam (NL)

(72) Inventors: Ying Hong, Morgan Hill, CA (US); Quang Le, San Jose, CA (US); Masaya Nishioka, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/011,694

(22) Filed: Aug. 27, 2013

(65) Prior Publication Data
US 2015/0062752 A1    Mar. 5, 2015

(51) Int. Cl.
*G11B 5/39* (2006.01)
*G11B 5/11* (2006.01)

(52) U.S. Cl.
CPC ....... *G11B 5/11* (2013.01); *G11B 5/398* (2013.01); *G11B 5/3912* (2013.01)

(58) Field of Classification Search
CPC .......... G11B 5/398; G11B 5/3903; G11B 2005/3996; G11B 5/3116; G11B 5/313; G11B 5/3909; G11B 5/3143; G11B 5/11; G11B 5/3912
USPC ........................................ 360/319, 324–324.2
See application file for complete search history.

(56) References Cited

U.S. PATENT DOCUMENTS

| | | | |
|---|---|---|---|
| 6,741,432 B2 | 5/2004 | Pinarbasi | |
| 7,092,221 B2 | 8/2006 | Gill | |
| 7,220,499 B2* | 5/2007 | Saito et al. | 428/811.5 |
| 7,327,539 B2* | 2/2008 | Saito | 360/324.1 |
| 7,365,949 B2* | 4/2008 | Hayakawa et al. | 360/324.1 |
| 7,369,371 B2 | 5/2008 | Freitag et al. | |
| 7,522,391 B2 | 4/2009 | Freitag et al. | |
| 7,599,155 B2* | 10/2009 | Saito et al. | 360/324.11 |
| 7,602,589 B2 | 10/2009 | Freitag et al. | |
| 7,751,154 B2 | 7/2010 | Wu | |
| 7,961,440 B2 | 6/2011 | Gill et al. | |
| 8,068,317 B2 | 11/2011 | Gill | |
| 8,266,785 B2 | 9/2012 | Freitag et al. | |

(Continued)

FOREIGN PATENT DOCUMENTS

| | | | |
|---|---|---|---|
| GB | 2400719 A | * | 10/2004 |
| GB | 2400720 A | * | 10/2004 |

(Continued)

OTHER PUBLICATIONS

Cyrille et al., "Nano Processing Strategies for MR Sensor Read Width and Stripe Height Formation," 2006 IEEE, IEEE Transactions on Magnetics, vol. 42, No. 10, Oct. 2006, pp. 2434-2437.

*Primary Examiner* — Will J Klimowicz
(74) *Attorney, Agent, or Firm* — Zilka-Kotab, PC

(57) ABSTRACT

A magnetic read sensor having an antiferromagnetic located embedded within a magnetic shield of the sensor so that the antiferromagnetic layer can pin the magnetization of the pinned layer without contributing to read gap thickness. The sensor is configured with a pinned layer having a free layer structure located within an active area of the sensor and a pinned layer that extends beyond the free layer and active area of the sensor. The antiferromagnetic layer can be located outside of the active and exchange coupled with the extended portion of the pinned layer.

12 Claims, 32 Drawing Sheets

(56) References Cited

U.S. PATENT DOCUMENTS

| | | | |
|---|---|---|---|
| 8,582,249 B2 * | 11/2013 | Sapozhnikov et al. | 360/324.11 |
| 8,619,393 B2 * | 12/2013 | Stokes | 360/324 |
| 8,711,528 B1 * | 4/2014 | Xiao et al. | 360/324.11 |
| 2004/0207959 A1 * | 10/2004 | Saito | 360/324.1 |
| 2004/0207960 A1 * | 10/2004 | Saito et al. | 360/324.1 |
| 2004/0207962 A1 * | 10/2004 | Saito et al. | 360/324.11 |
| 2005/0270703 A1 * | 12/2005 | Hayakawa et al. | 360/324.1 |
| 2007/0230066 A1 * | 10/2007 | Gill | 360/324.1 |
| 2009/0021870 A1 | 1/2009 | Pinarbasi | |
| 2009/0316308 A1 * | 12/2009 | Saito et al. | 360/324.1 |
| 2012/0134057 A1 * | 5/2012 | Song et al. | 360/319 |
| 2012/0276415 A1 | 11/2012 | Sapozhnikov et al. | |
| 2012/0320473 A1 | 12/2012 | Okamura et al. | |
| 2013/0044394 A1 * | 2/2013 | Stokes | 360/319 |

FOREIGN PATENT DOCUMENTS

| | | | |
|---|---|---|---|
| GB | 2419458 A | * | 4/2006 |
| JP | 2004335071 A | * | 11/2004 |
| JP | 2005044489 A | * | 2/2005 |
| JP | 2005044490 A | * | 2/2005 |

* cited by examiner

MAGNETIC SENSOR WITH RECESSED AFM SHAPE ENHANCED PINNING AND SOFT MAGNETIC BIAS

FIELD OF THE INVENTION

The present invention relates to magnetic data recording and more particularly to a magnetic read sensor having an antiferromagnetic pinning layer that is embedded within a bottom shield so as to reduce gap spacing and provide increased data density.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the adjacent magnetic media.

As the need for data density increases there is an ever present need to decrease the gap spacing of the magnetic sensor in order to decrease bit size and thereby increase linear data density. However, the thickness of the sensor layers can only be reduced so much without adversely affecting sensor performance and stability. Therefore, there remains a need for a magnetic sensor design that can provide robust sensor performance while also reducing gap spacing.

SUMMARY OF THE INVENTION

The present invention provides a magnetoresistive sensor that includes first and second magnetic shields a sensor stack sandwiched between the first and second magnetic shields. The sensor stack includes a pinned layer structure a free layer structure and a non-magnetic layer sandwiched between the pinned layer structure and the free layer structure. The free layer structure extends to a first stripe height measured from an air bearing surface and the pinned layer structure extends to a second stripe height measured from the air bearing surface, the second stripe height being greater than the first stripe height. The sensor also includes a layer of anti-ferromagnetic material embedded in the first magnetic shield and exchange coupled with a portion of the pinned layer structure.

Because the antiferromagnetic layer is removed from the active area of the sensor and embedded within the magnetic shield, it does not contribute to read gap, which is measured as the distance between the upper and lower shields at the air bearing surface. This advantageously increases data density while also providing robust magnetic pinning of the pinned layer structure.

The bottom shield can include a shield base layer and a magnetic fill layer in the active sensor area. The layer of antiferromagnetic material can be formed over the bottom shield base layer in an area outside of the base layer. A thin layer of magnetic material can be formed over and exchange coupled with the layer of antiferromagnetic material and the pinned layer structure can extend over and contact the magnetic layer. The magnetic fill layer, located in the active area of the sensor behaves functionally as a part of the bottom shield so that the read gap is the distance between upper edge of the magnetic fill layer and the bottom edge of the upper shield at the air bearing surface.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
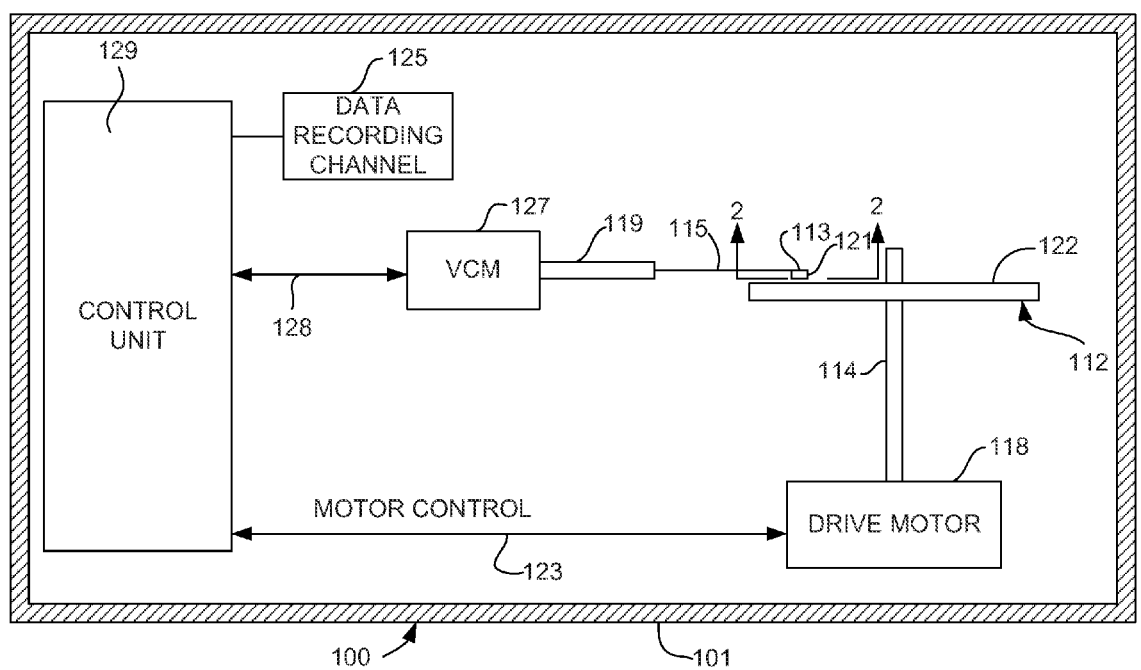
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118, all of which are mounted within a housing 101. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
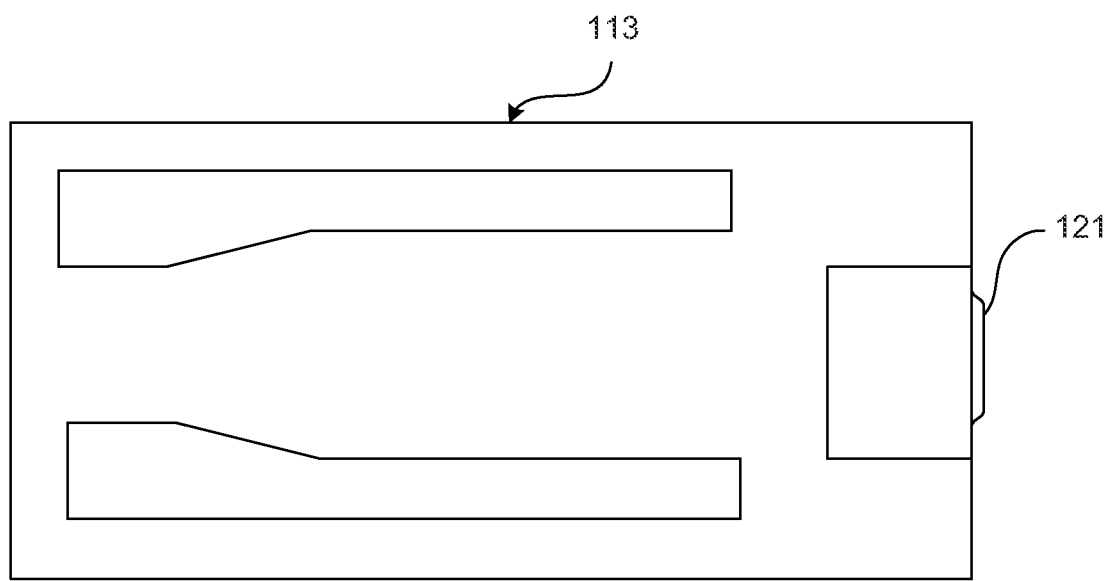
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
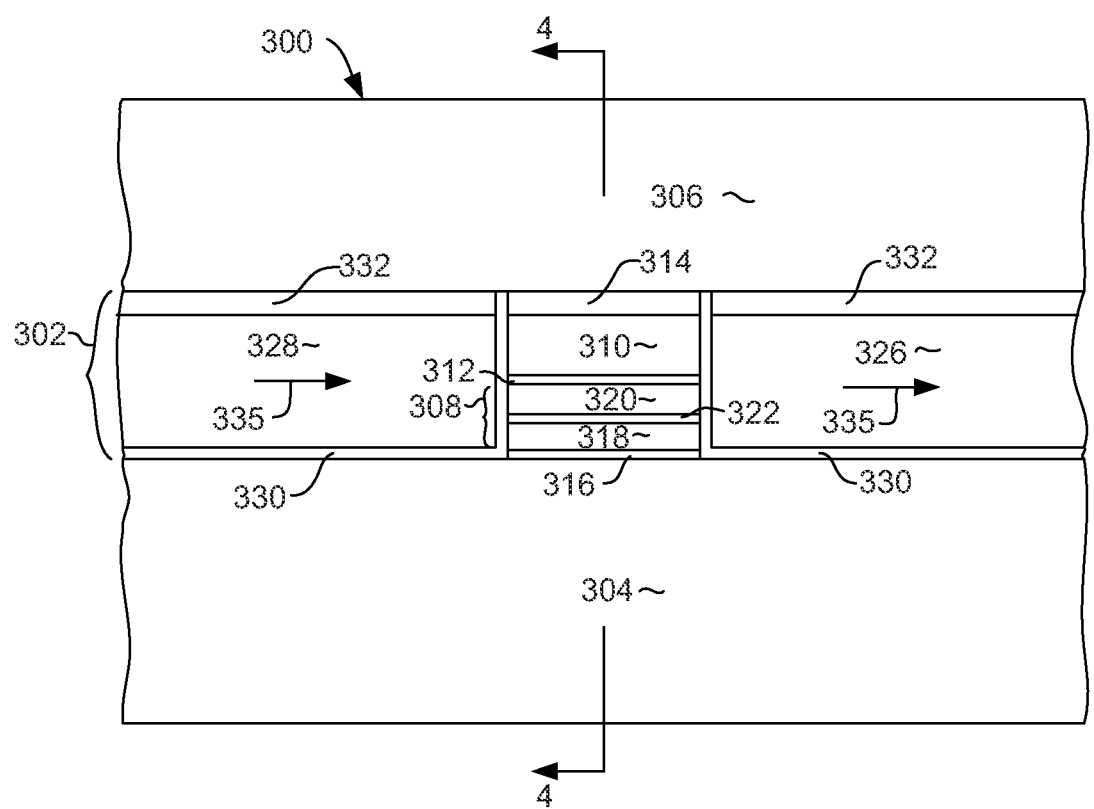
FIG. 3 is an air bearing surface view of a magnetic read sensor according to an embodiment of the invention.

FIG. 3 shows a schematic view of a magnetic read head 300 as viewed from the air bearing surface. The read head 300 includes a sensor stack 302 that is sandwiched between a leading magnetic shield 304 and a trailing magnetic shield 306. The sensor stack 302 includes a magnetic pinned layer structure 308, a magnetic free layer structure 310 and a non-magnetic barrier or spacer layer 312 sandwiched between the free and pinned layer structures 308, 310. If the sensor 302 is a tunnel junction (TMR) sensor, then the layer 312 can be a non-magnetic, electrically insulating barrier layer such as MgO. If the sensor 302 is a giant magnetoresistive (GMR) sensor, the layer 312 can be a non-magnetic, electrically conductive material such as AgSn. A capping layer 314 may be provided at the top of the sensor stack 302 to protect the under-lying layers during manufacture. A seed layer 316 may also be provided at the bottom of the sensor stack 302 to promote a desired grain structure in the other above applied layers of the sensor stack 302.

The pinned layer structure 308 can be an anti-parallel coupled structure that includes first and second magnetic layers 318, 320 that are anti-parallel coupled across a non-magnetic, anti-parallel coupling layer such as Ru 322. The free layer 310 has a magnetization that is biased in a direction that is parallel with the air bearing surface and orthogonal to the directions of magnetization of the pinned layers 318, 320, but which is free to move in response to an external magnetic field. Biasing of the magnetization of the free layer 310 can be provided by magnetic bias structures 326, 328, which can be soft magnetic bias layers or hard magnetic bias layers. If the bias structures 326, 328 are soft magnetic bias structures, they can be formed of a material having a low magnetic coercivity and high saturation magnetization such as CoFe or NiFe. If the layers 326, 328 are hard magnetic bias structures, they can be constructed of a material such as CoPt or CoPtCr. The bias structures 326, 328 are separated from the sensor stack 302 by non-magnetic, electrically insulating layers 330, which can be constructed of one or more layers of material such as alumina ($Al_2O_3$), SiN, TaOx, MgO, SiOxNy, or a combination thereof. A bias capping layer 332 can be provided at the top of each of the magnetic bias structures 326, 328. These capping layers 332 can be constructed of a material such as Ta/Ru, Ta/Cr, Ta/Rh, or a combination thereof, which protects the bias structures 326, 328. The bias structures 326, 328 have a magnetization that is oriented in a desired direction parallel with the ABS as indicated by arrows 335.

Figure 4:
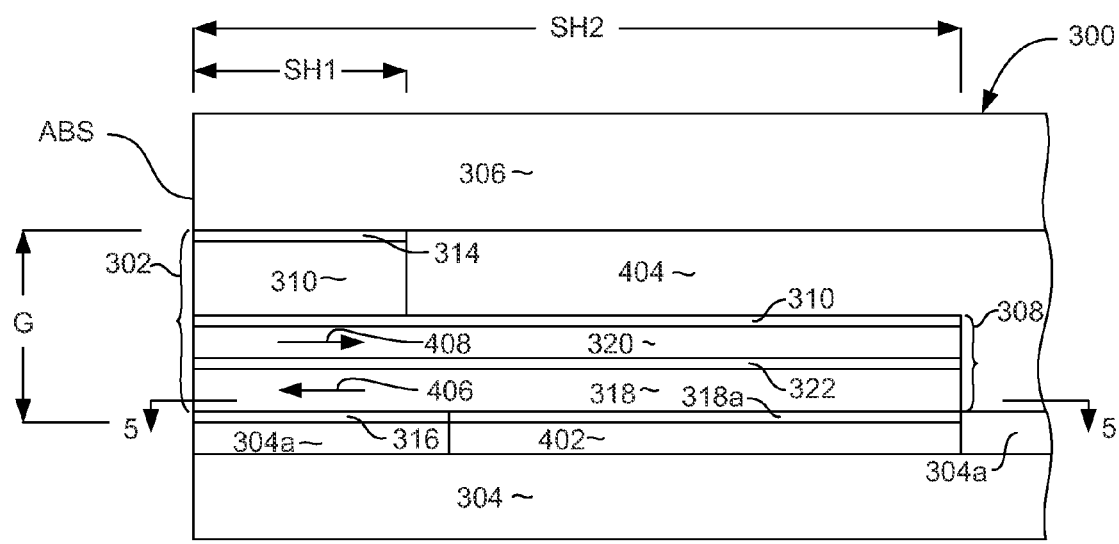
FIG. 4 is a side, cross sectional view of the magnetic sensor as seen from line 4-4 of FIG. 3.

FIG. 4 shows a side cross sectional view of the sensor 300. As can be seen in FIG. 4, the free layer 310 extends to a first stripe height distance SH1 as measured from the air bearing surface ABS to the back edge of the free layer 310 opposite the ABS. The capping layer 314 also extends to the first stripe height location and the non-magnetic barrier/spacer layer 310 can extend to this first stripe height distance as well. However, all or a portion of the non-magnetic barrier/spacer layer 310 can extend beyond the first stripe height distance SH1 as shown in FIG. 4.

The pinned layer structure 308, however, extends beyond the first stripe height SH1 to a second stripe height distance SH2. This extension of the pinned layer structure 308 improves pinning strength by providing a desired shape enhanced magnetic anisotropy as well as increased pinned layer area. The area behind SH1 and behind SH2 can be filled with a non-magnetic, electrically insulating fill layer 404 such as alumina.

The sensor includes a layer of anti-ferromagnetic Material (AFM) 402 that is embedded within the bottom or leading shield 304. The AFM is only located in the region that is beyond the first stripe height SH1 so that it is not between the free layer 310 and the leading shield 304. As can be seen in FIG. 4, the sensor 300 includes a shield fill material 304a that can be constructed of a material such as NiFe or CoFe or alloys thereof that are adjusted to provide a desired saturation magnetization. The shield fill layer 304a functions magnetically as a part of the shield 304, so that the gap thickness G of the sensor is only the distance between the top of the shield fill layer 304a and the leading edge of the trailing magnetic shield 306. The layer 304a can be NiFe, CoFe or alloys thereof. As can be seen, the AFM layer 402 does not contribute to the gap thickness so that the total gap thickness G is greatly reduced.

Also as can be seen in FIG. 4, the sensor 300 includes pinned sub-layer 318a between the AFM 402 and first magnetic pinned layer 318. This layer 318a can be constructed of the same material as the layer 318 and is magnetically connected with the layer 318 so that it functionally becomes a part of the first pinned layer 318. However, this layer 318a is strongly exchange coupled with the AFM layer 402 and carries this exchange coupling through to the rest of layer 318 to pin the magnetization of the layer 318 in a first direction perpendicular to the ABS as indicated by arrow 406. The anti-parallel coupling between the layer 318 and layer 320 pins the magnetization of the second pinned layer 320 in a second direction that is perpendicular to the ABS and opposite to the first direction as indicated by arrow 408. The AFM layer 402 can be constructed of a material such as IrMn or PtMn, NiMn, PdPtMn, or CrPtMn, and as can be seen, the AFM layer 402 is effectively embedded within the shield 304/304a in a region that is removed from the air bearing surface. In this way, the AFM layer 402 can provide strong pinning, while also not contributing to gap thickness. This, therefore, provides the desired small gap spacing for improved data density without sacrificing sensor performance or reliability.

Figure 5:
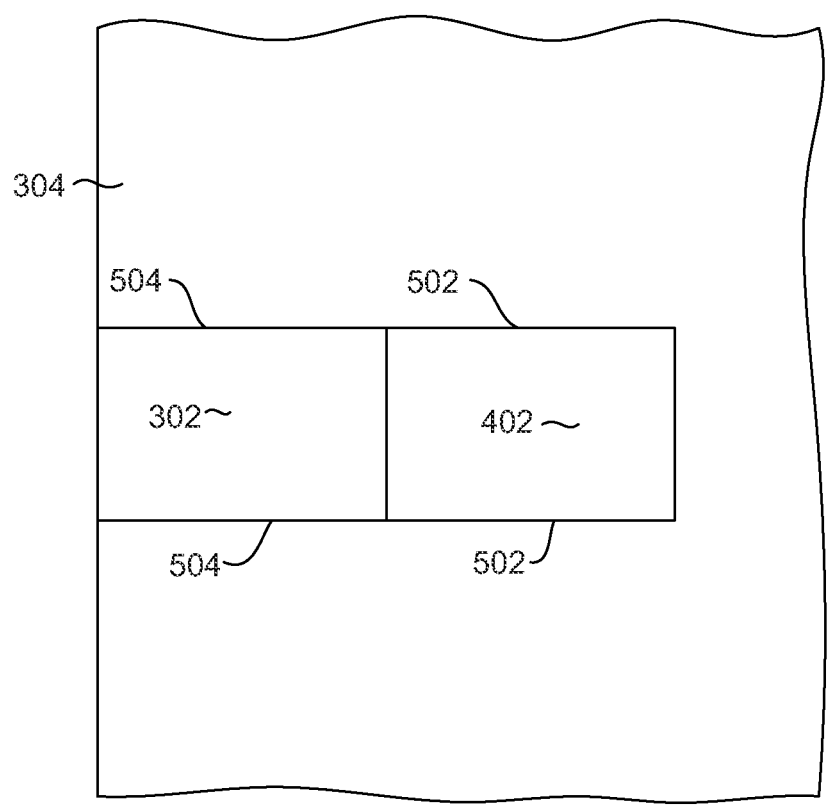
FIG. 5 is a top down, cross sectional view of the sensor of FIGS. 3 and 4 showing a pinning structure according to a first embodiment.
Figure 6:
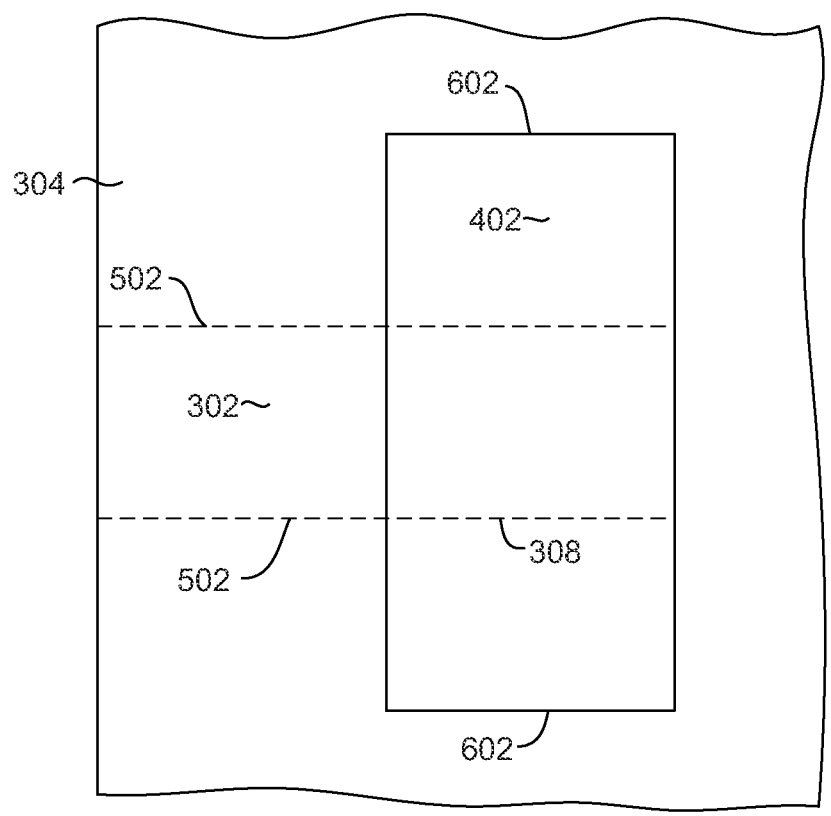
FIG. 6 is a top down, cross sectional view of the sensor of FIGS. 3 and 4 showing a pinning structure according to another embodiment.
Figure 7:
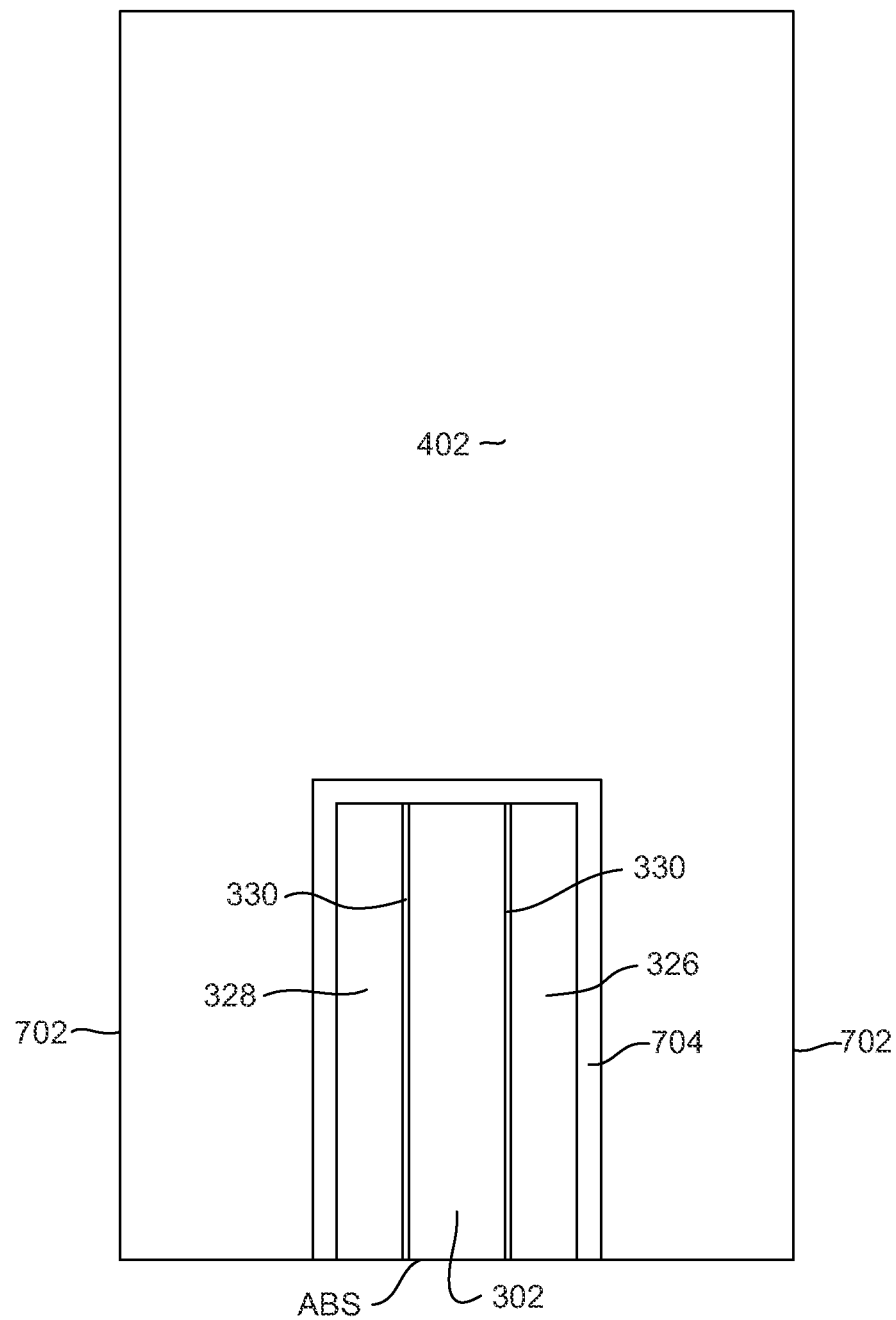
FIG. 7 is a top down, cross sectional view of the sensor of FIGS. 3 and 4 showing a pinning structure according to a first embodiment of the invention.

FIGS. 5, 6 and 7 show a top down view as seen from line 5-5 of FIG. 4 illustrating several possible configurations of the AFM layer 402. With reference to FIG. 5, the AFM layer 402 can have sides 502 that are aligned with the sides 504 of the sensor stack 302. This alignment of the sides 502, 504 can be achieved using a self aligned processes that will be described in greater detail herein below.

FIG. 6 shows another possible configuration of the AFM layer 402. In this configuration the AFM layer 402 has sides 602 that extend beyond the sides 502 of the sensor stack 302. In FIG. 6 the portion of the extended pinned layer structure 308 that extends beneath the AFM layer 402 is shown in dashed line. A process for constructing a sensor having such an AFM configuration will be described herein below.

FIG. 7 illustrates yet another configuration wherein the AFM layer has a bent or "U" shape. In this configuration the AFM has side portions 702 that extend toward or to the air bearing surface ABS. The AFM layer 402 can be separated from the bias structures 326 and sensor stack 302 by an insulation layer 704. The construction of a sensor having such an AFM structure 402 will be described herein below.

Figure 8:
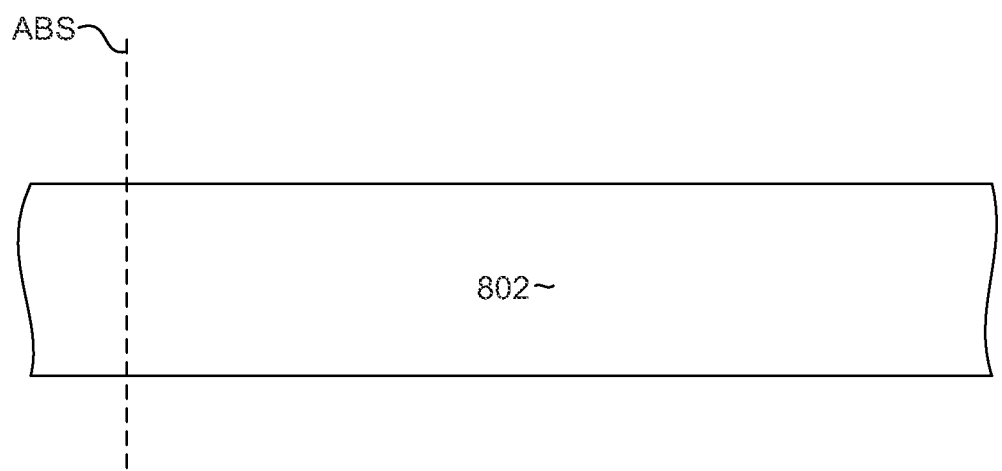
FIGS. 8-32 are views of a magnetic sensor in various intermediate stages of manufacture in order to illustrate various methods for manufacturing a magnetic sensor.

FIGS. 8-32 show a magnetic sensor in various intermediate stages of manufacture in order to illustrate methods for manufacturing a magnetic sensor with an embedded AFM having various configurations. With particular reference to FIG. 8, a magnetic shield base portion 802 is formed. This shield can be formed on a substrate (not shown) by electroplating and can be constructed of a magnetic material such as NiFe or CoFe or a combination of these materials. In FIG. 8 the location of an intended air bearing surface plane is indicated by the dashed line denoted as ABS.

Figure 9:
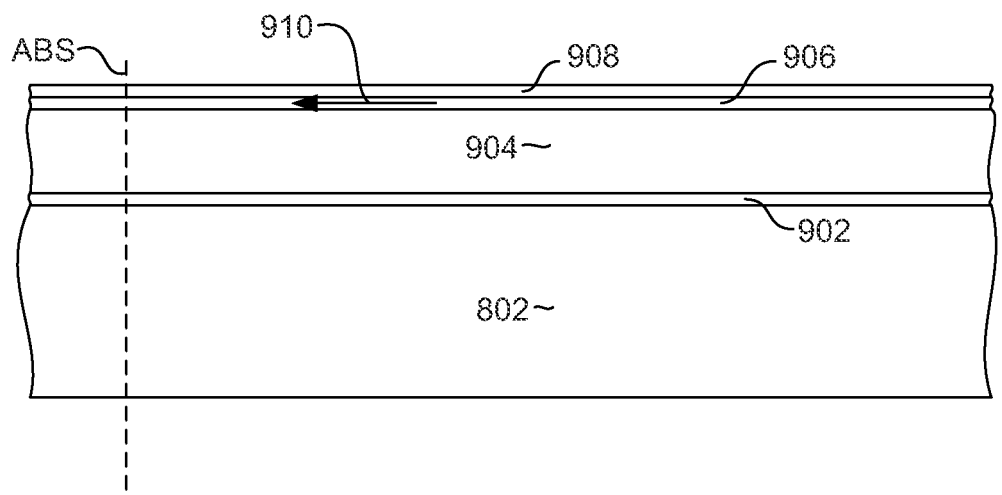

Then, with reference to FIG. 9 a seed layer 902 is deposited over the shield 802. The seed can be constructed of Ta or Ru or a combination both of these materials. Then a layer of antiferromagnetic material (AFM) 904 is deposited over the seed layer. The AFM layer 904 is preferably constructed of IrMn but could also be constructed of PtMn or NiMn, PdPtMn, or CrPtMn. The seed layer 902 allows the ATM layer to grow with a crystal structure that promotes desired antiferromagnetic properties. A layer of magnetic material 906 is deposited directly onto the AFM layer 904. The magnetic material 906 is a material that will make up a first portion of a first pinned layer (AP1 first portion) as will be seen below. Therefore, the magnetic layer 906 is constructed of a material having desired pinned layer properties, such as CoFe or some similar material. A capping layer 908 is then deposited over the magnetic layer 906. The capping layer 908 can be a material such as Ru, Ta, Au, Rh, Cu or Mg or optional no capping but with a thicker layer 906. All of the layers 902, 904, 906, 908 can be deposited in a single deposition tool, such as a sputter deposition tool, in situ, without breaking vacuum.

After all of the layers 902, 904, 906, 908 have been deposited, a first annealing process is performed to achieve strong magnetic exchange coupling between the magnetic layer 906 and the AFM layer 904 and to strongly pin the magnetization of the magnetic layer 906 in a desired direction perpendicular to the ABS as indicated by arrow 910. This annealing process includes heating the structure to a high temperature while applying a magnetic field. The capping layer 908 protects the underlying layers 906, 904 during this high temperature annealing.

Figure 10:
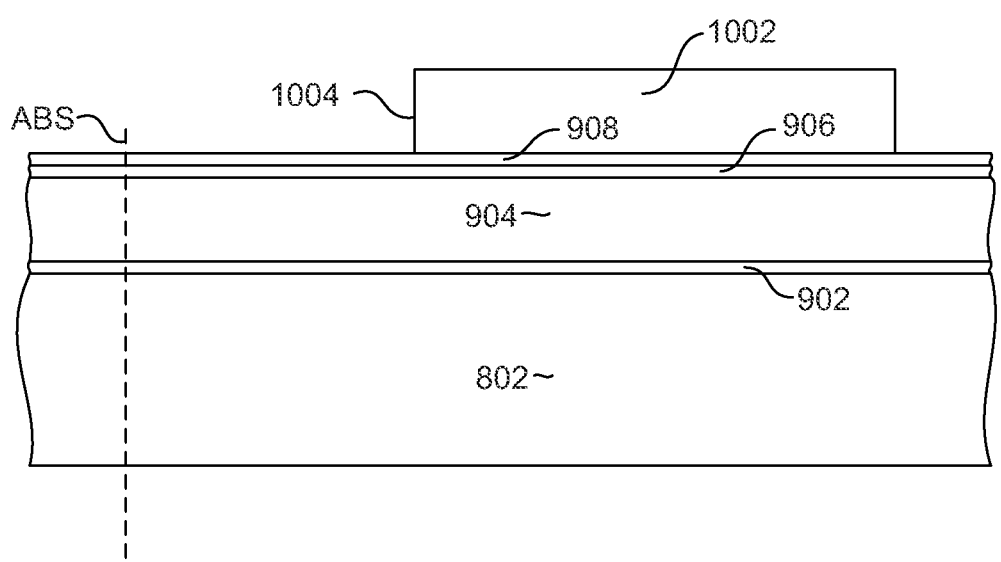

With reference now to FIG. 10, an AFM defining mask structure 1002 is formed over the layers 902, 904, 906, 908. The mask 1002 can include a photolithographically patterned and developed photoresist and may include other layers as well, such as CMP stop layer such as carbon, one or more hard mask layers, a bottom anti-reflective coating release layer, image transfer layer, etc. A reactive ion etching can be performed to transfer the image of the photoresist mask onto these under-lying layers.

Figure 11:
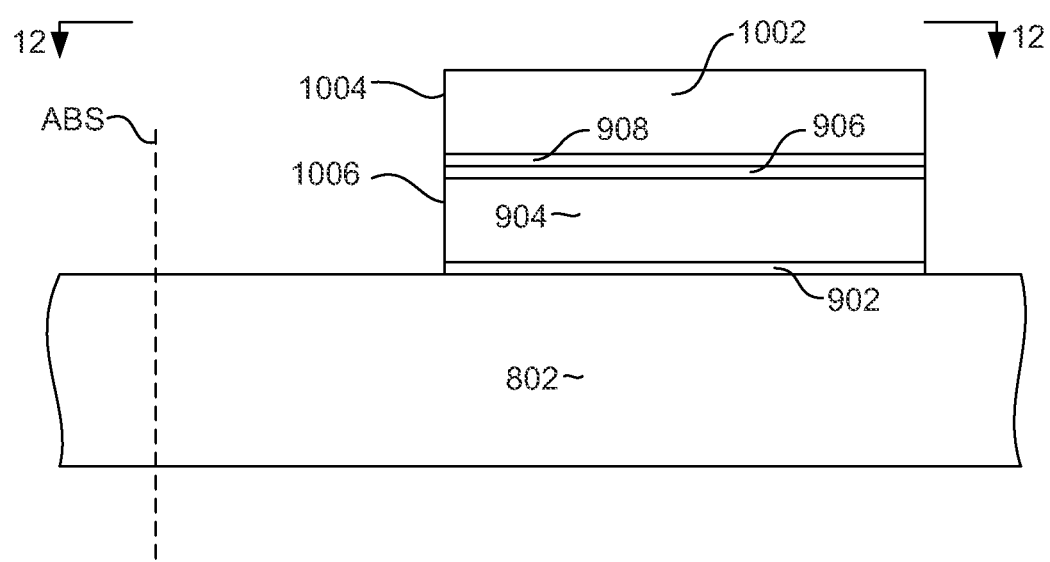
Figure 12:
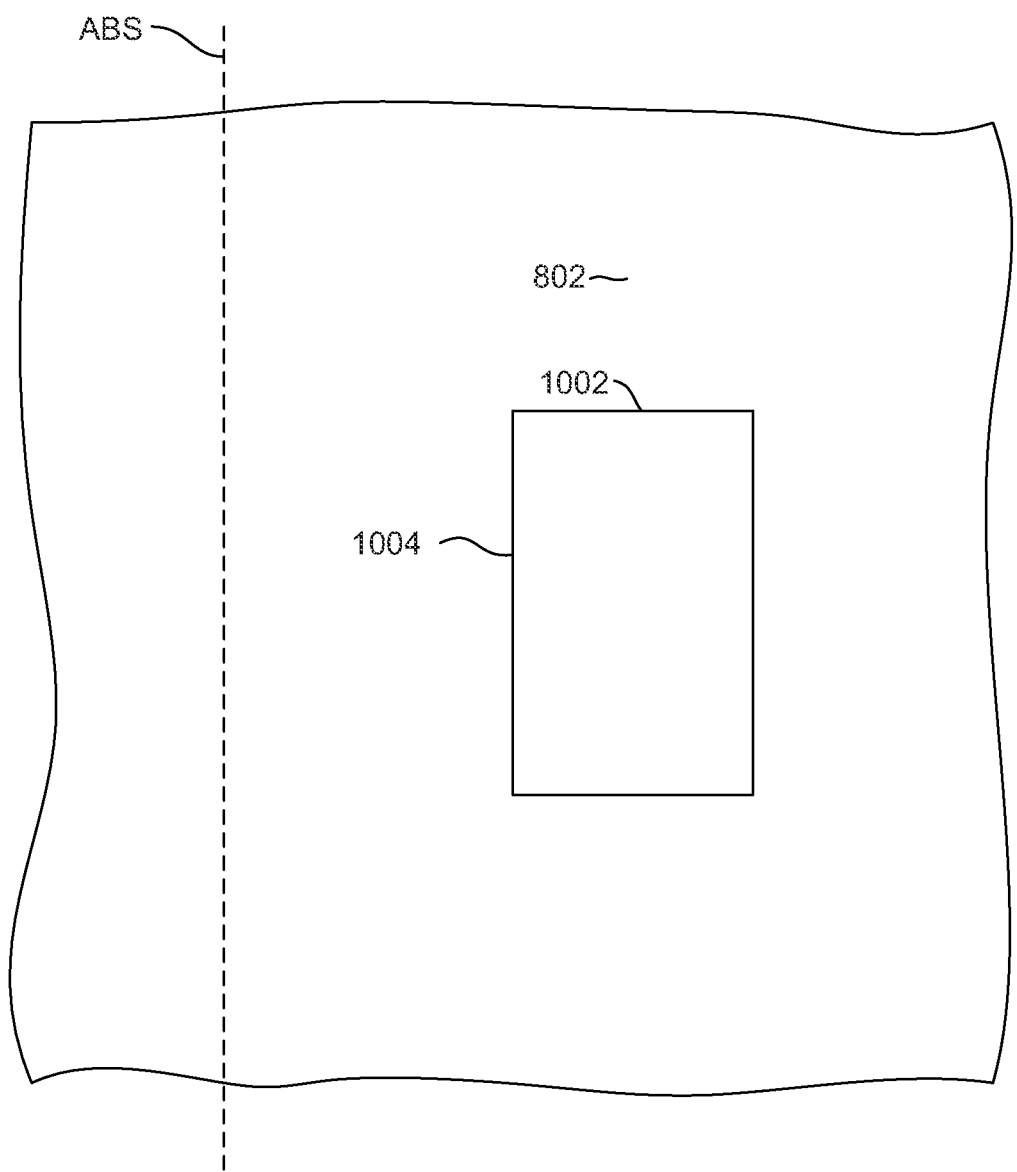
Figure 32:
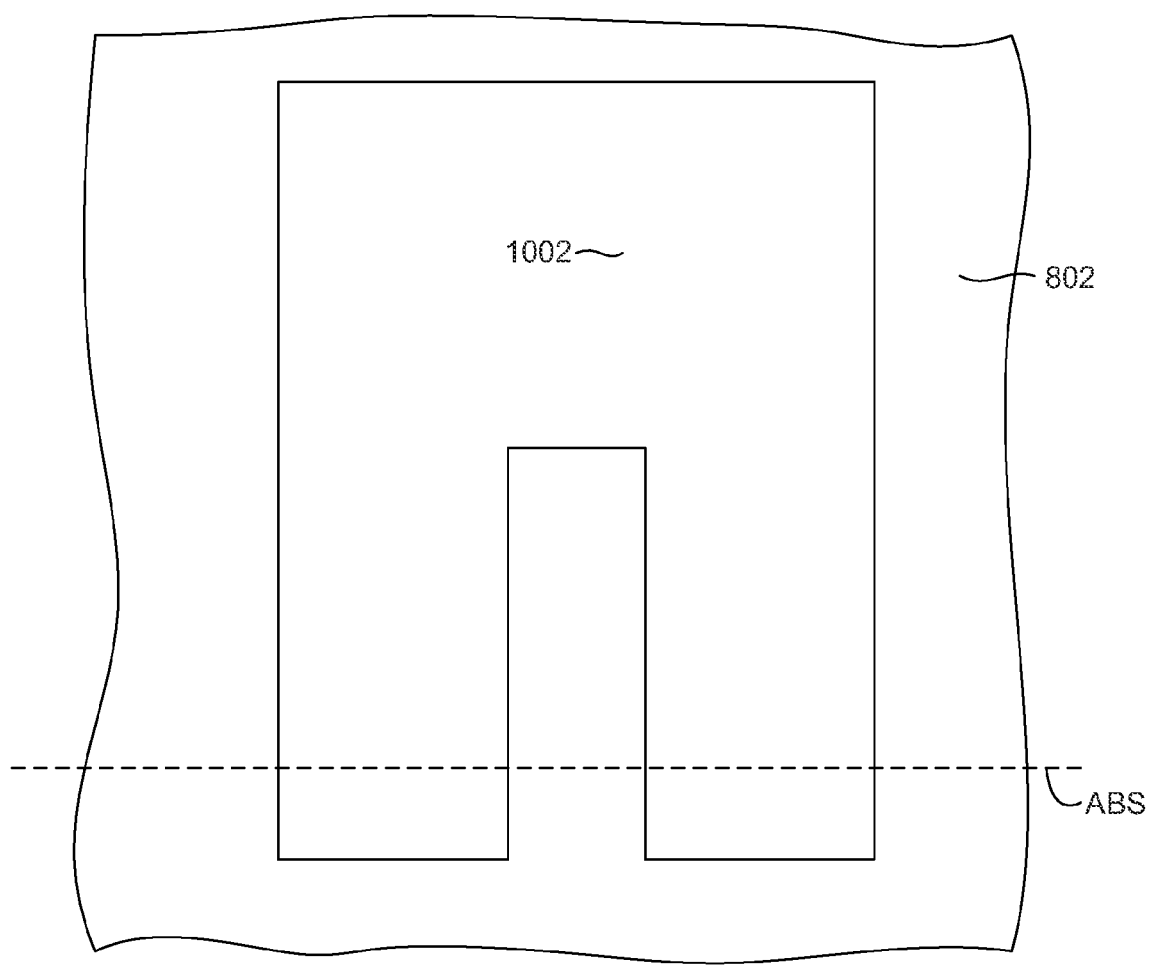

After the mask 1002 has been formed, an ion milling process can be performed to remove portions of the layers 902, 904, 906, 908 that are not protected by the mask 1002. As can be seen in FIG. 11, the mask 1002 has a front edge 1004 that defines a front edge 1006 of the AFM layer 904. The mask 1002 can be formed to define various AFM shapes. For example, FIG. 12 shows a top down view as seen from line 12-12 of FIG. 11. In FIG. 12 it can be seen that the mask 1002 can be formed with a rectangular shape having the front edge 1004 located at a desired distance from the AFM plane. The mask 1002 could also be constructed as a bent "U" shape as shown in FIG. 32. In this case the mask 1002 can be constructed to have side portions that extend beyond the ABS plane.

Figure 13:
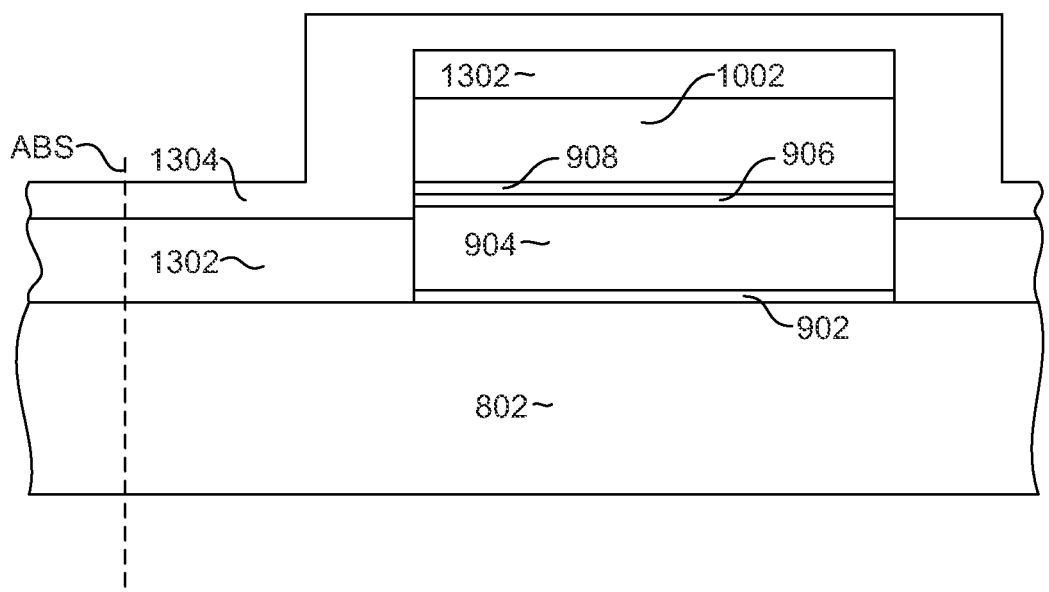

With reference now to FIG. 13, a magnetic material 1302 such as NiFe, CoFe or alloys thereof is deposited over the shield 802 and mask 1002. This magnetic material is a magnetic fill layer that will effectively become a part of the leading magnetic shield 802 with the AFM 904 being embedded therein as will be seen. The material of the layer 1302 is chosen so as to provide optimal magnetic moment to avoid magnetic saturation. Optionally, and not shown, a glancing milling can be performed to remove side portions of the layer 1302 before depositing a capping layer 1304. Then, the capping layer 1304 is deposited over the magnetic material 1302. The capping layer 1304 can be constructed of one or more of Ta and/or Ru, and while it can be constructed of the same material as the capping layer 908, it is preferably deposited thicker than the layer 908 for reasons that will become apparent below. The layer 1304 is deposited at least to the level of the layer 908.

Figure 14:
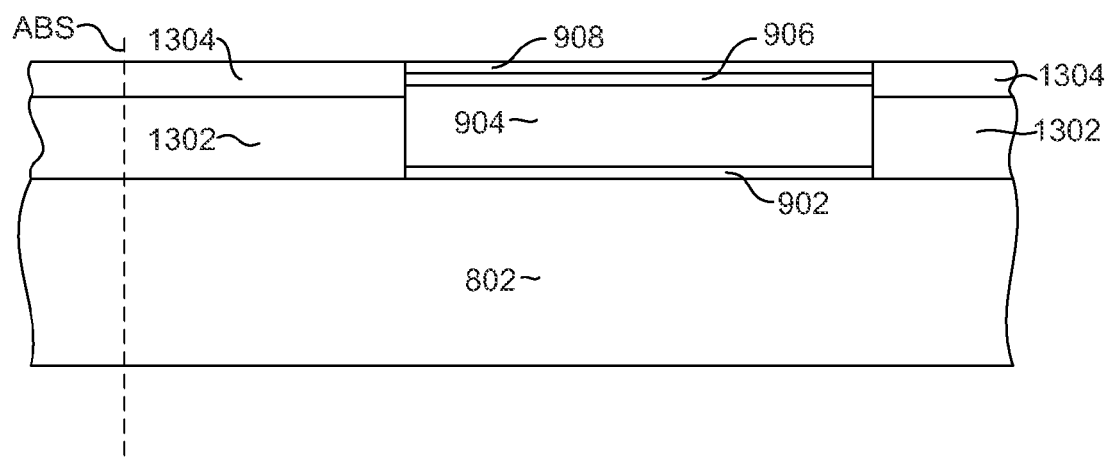
Figure 15:
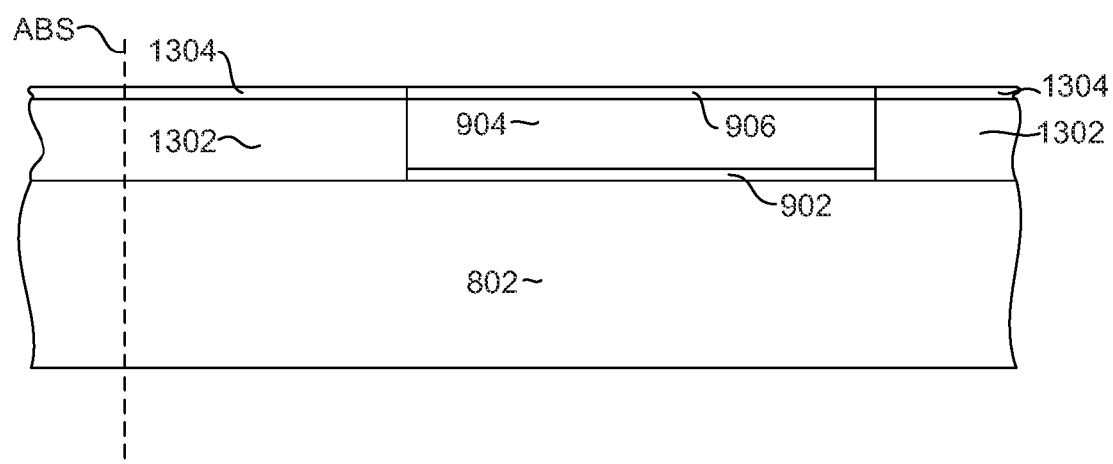

After the layers 1302, 1304 have been deposited a mask liftoff process is performed leaving as structure as shown in FIG. 14. Alternatively, a layer of material that is resistant to chemical mechanical polishing can be deposited such as carbon or diamond like carbon, followed by a mask liftoff process and chemical mechanical polishing (CMP). A reactive ion etching can then be performed to remove the remaining CMP stop layer (e.g. carbon or diamond like carbon). These processes can be adjusted so that layer 1304 has a desired thickness to provide optimal magnetic spacing between the shield 802 and later the pinned layer structure, as will be seen. A sputter etching or glancing angle milling can be performed to remove any remaining fencing of materials and to adjust the thickness of the layer 1304. In FIG. 15 it can be seen that, because the layer 1304 was deposited thicker than the capping layer 908 (FIG. 14) the capping layer 1304 remains even though the capping layer 908 has been removed during the sputter etching, which can be performed in a deposition tool expose layer 906 before further deposition of sensor layer as discussed below.

Figure 16:
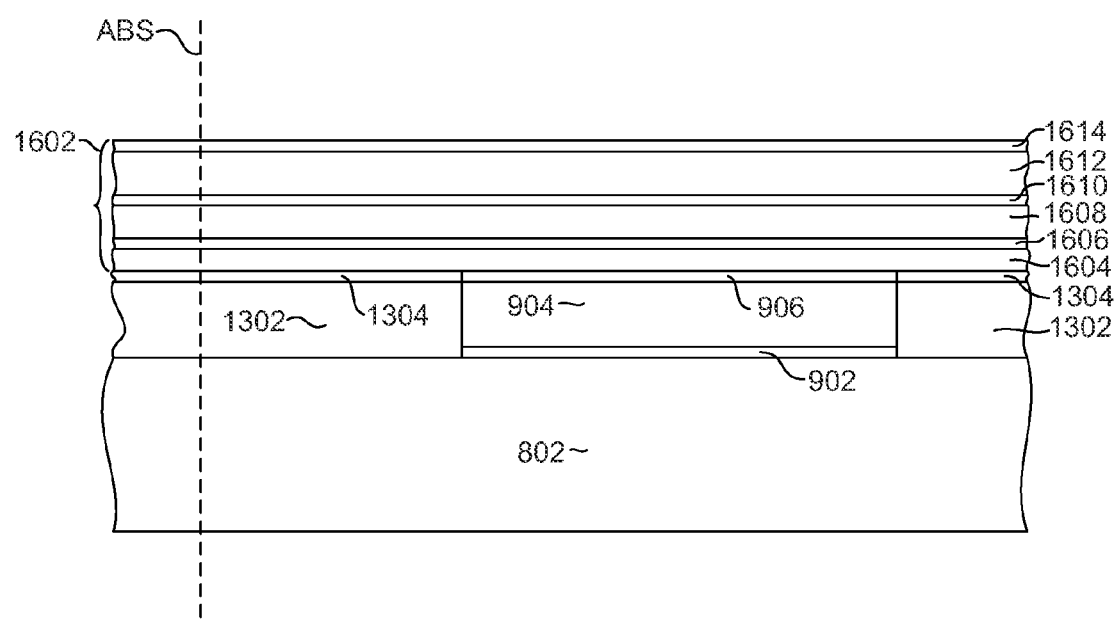

After the above processes have been performed, the structure is placed back into a deposition tool for further deposition of sensor layers. With reference to FIG. 16, the remaining sensor layers 1602 are deposited over the layers 1304, 906. A second portion of the first pinned layer 1604 is deposited over the magnetic layer 906 so that it is in direct contact and "stitched to" the magnetic layer 906. As will be recalled, the previously performed annealing process pinned the magnetization of the layer 906 in a desired direction perpendicular to the ABS. This pinned magnetization carries through the above applied magnetic layer 1604 so that both layers 906 and 1604 have their magnetizations pinned in the same desired direction perpendicular to the ABS plane. A second annealing process is then performed to set the magnetization of the layer 1604. The magnetic layer 906, which was previously annealed, will, therefore, be annealed twice.

After the layer 906 is deposited, an anti-parallel coupling layer 1606 such as Ru is deposited over the layer 1604. A second magnetic pinned layer (AP2) such as NiFe or CoFe 1608 is deposited over the anti-parallel coupling layer 1606. A non-magnetic spacer or barrier layer 1610 is deposited over the second magnetic pinned layer 1608. A magnetic free layer 1612 is deposited over the non-magnetic spacer or barrier layer 1610. The magnetic free layer 1612 can include one or more layers of CoFe, NiFe or other magnetic materials. Finally, a capping layer 1614 is deposited over the magnetic free layer 1612.

Figure 17:
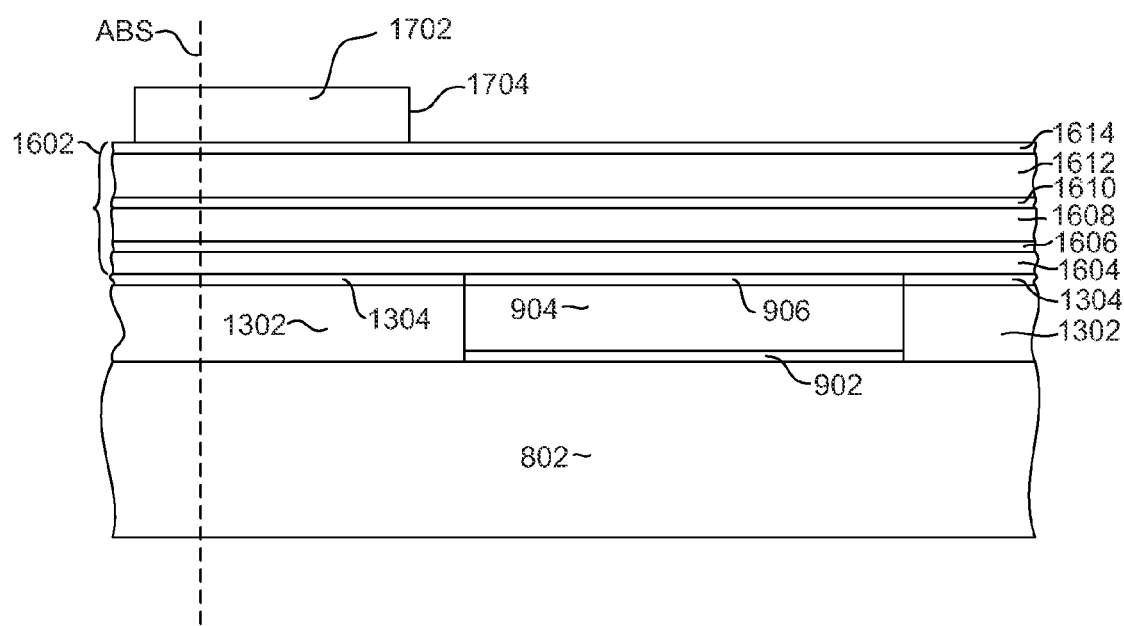

With reference now to FIG. 17, a stripe height defining mask 1702 is formed over the sensor layers 1602. The stripe height defining mask 1702 has a back edge 1704 that is located a desired distance from the air bearing surface plane (ABS) so as to define a desired sensor stripe height (the stripe height being the length of the sensor as measured from the air bearing surface (ABS)). Again, this mask structure 1702 can include a photolithographically patterned photoresist and may include other layers such as one or more hard mask layers a CMP stop layer an image transfer layer a bottom anti-reflective coating layer and/or a release layer, all of which are not shown for purposes of clarity. A reactive ion etching can be used to transfer the image of the photolithographically patterned photoresist layer onto one or more of these other mask layers.

Figure 18:
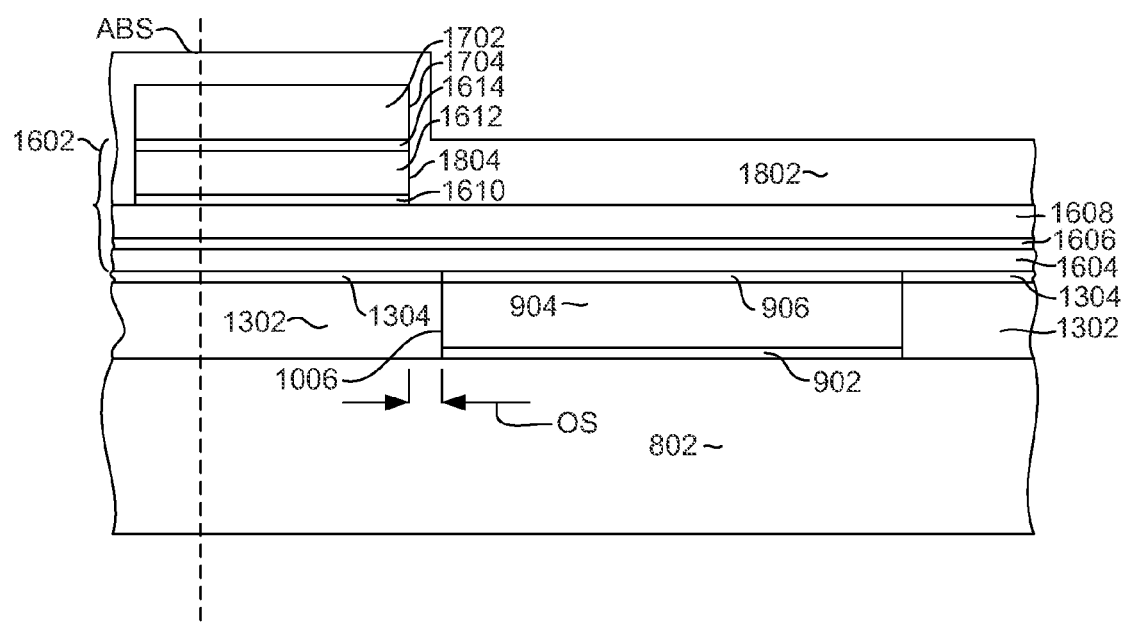

An ion milling is then performed to remove portions of the free layer 1612 that are not protected by the stripe height defining mask 1702. While this ion milling may remove the non-magnetic barrier/spacer layer 1610 it can be terminated before removing the pinned layer 1608. Alternatively, the ion milling can be terminated before reaching the barrier/spacer layer 1610, and then a treatment with a gas such as $N_2$, $O_2$ or $O_3$ can be performed to render the remaining portion of the free magnetic layer 1612 that is not protected by the mask non-magnetic. For this stripe height defining step, the ion milling can stop at the barrier/spacer layer 1610, AP2 layer 1608, AP1 layer 1604, or AFM layer 904. If ion milling is stopped at the barrier/spacer 1610, AP2 1608, AP1 1604, or AFM 904 the pinned layer structure will not have shape anisotropy. The choice of where to stop ion can be used to strike a balance between shape anisotropy and minimizing etching damage or "knock-on effects". After the ion milting has been performed, a non-magnetic, electrically insulating fill layer 1802 is deposited, as shown in FIG. 18. The fill layer 1802 can be alumina, tantalum oxide, silicon nitride, or a combination of these materials, and is preferably deposited at least to the level of the capping layer 1614.

The back edge 1704 of the mask 1702 is located such that after the ion milling, the free layer 1612 has a back edge 1804 that is located at a desired offset distance (OS) relative to the front edge 1006 of the AFM layer 904. The offset distance (OS) is the difference between the location (as measured from the ABS plane) of the back edge of the free layer 1804 and front edge of the AFM 1006. This offset distance OS is preferably as small as possible while taking into account manufacturing tolerances and variations, such as variations in mask alignment. One way to minimize such variations is to use the same photolithographic tooling for patterning both the AFM defining mask 1002 (FIG. 10) and the stripe height defining mask 1702 (FIGS. 17, 18).

Figure 19:
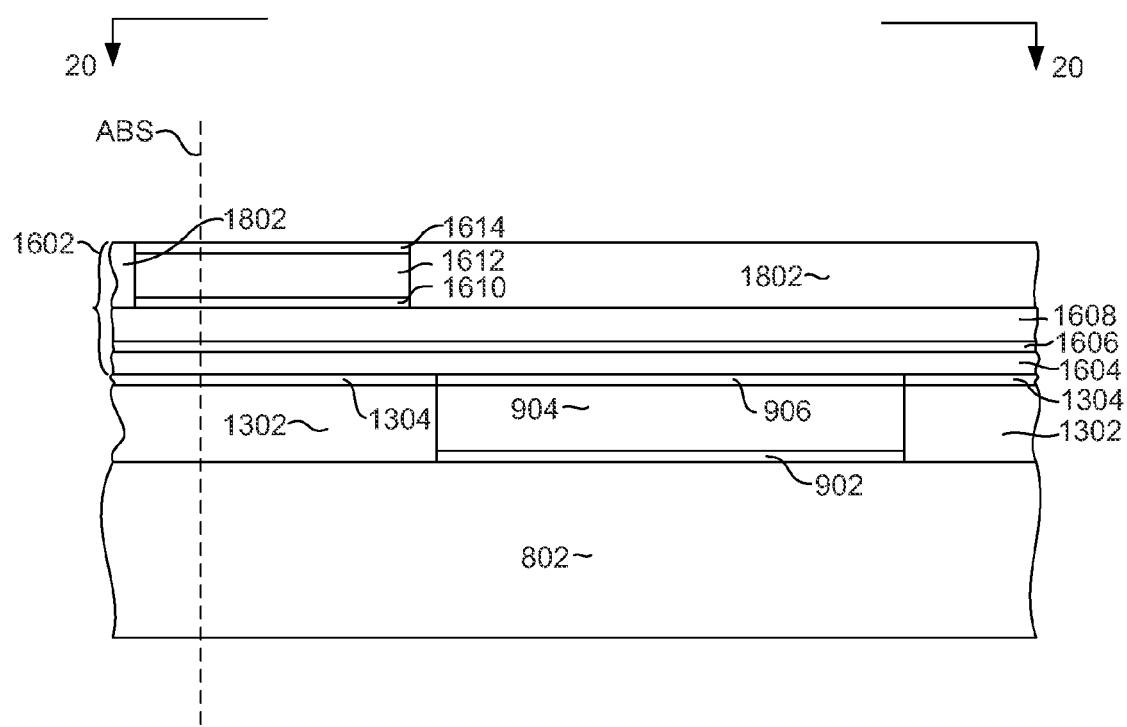
Figure 20:
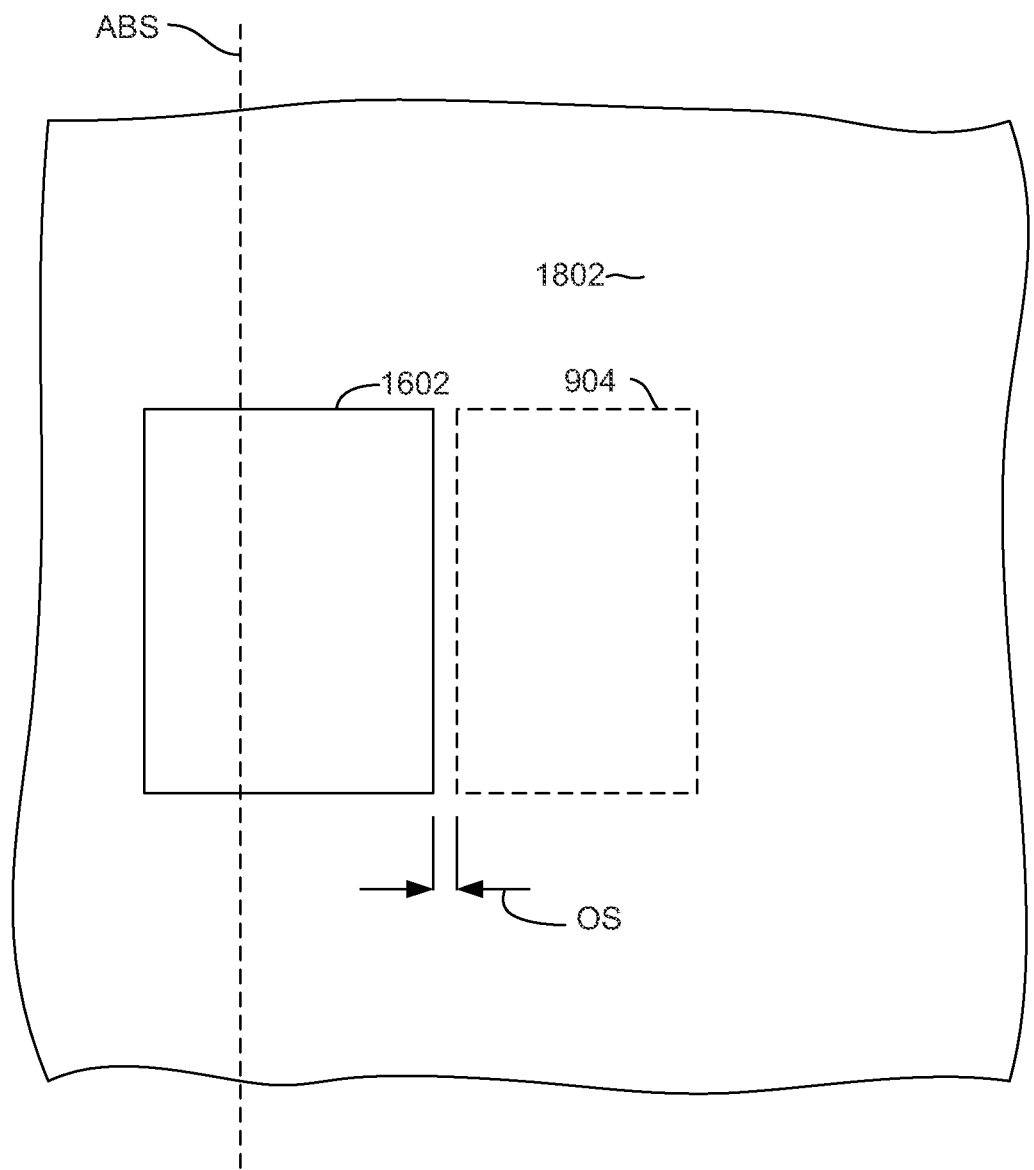

Then, a mask liftoff and planarization process can be performed, leaving a structure such as shown in FIG. 19. This can include depositing a CMP stop layer such as carbon (not shown), performing a mask liftoff such as a chemical liftoff, performing a chemical mechanical polishing and performing a reactive ion etching (RIE) to remove the remaining CMP stop layer (including the CMP stop layer within the mask structure 1702 if one was included). FIG. 20 shows a top down view of the structure of FIG. 19. The dashed line denoted 904 indicates the location of the embedded AFM 904 beneath the fill layer 1802.

Figure 21:
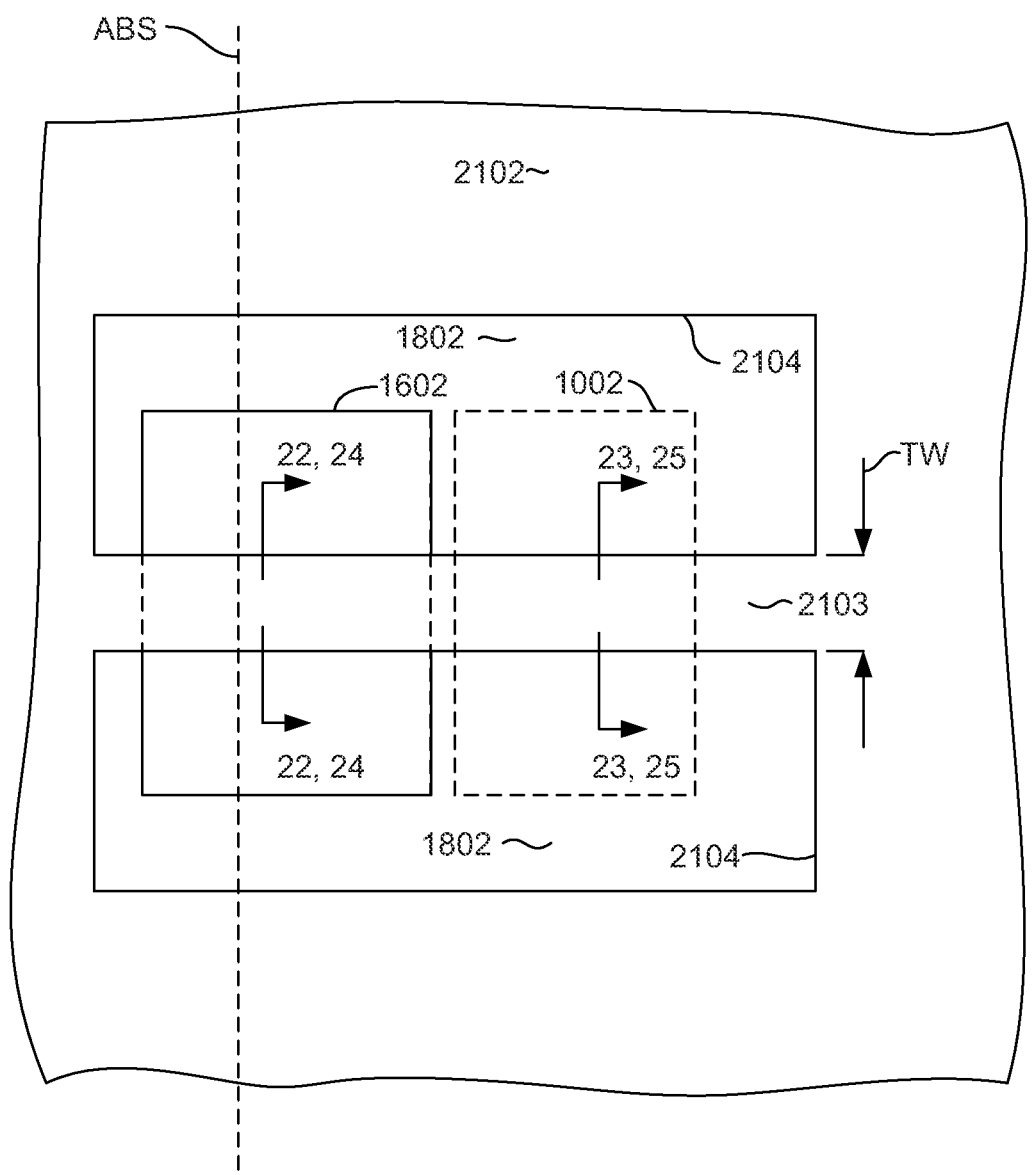

With reference to FIG. 21 a track-width defining mask 2102 is formed. The track-width defining mask 2102 has openings 2104 and the mask area between these openings 2103 is configured to define a track-width TW of the sensor. As before, the mask structure can include a photolithographically patterned photoresist layer and may also include other layers as well, such as one or more hard mask layers, an image transfer layer, a bottom anti-reflective coating layer, release layer, CMP stop layer, etc.

After the mask has been formed, an ion milling can be performed to form the sides of the sensor and define the track-width of the sensor. The configuration of the AFM layer can be controlled by the manner in which this ion milling process is performed. If a partial ion milling is performed, the AFM layer can be formed so as to extend from the sides, such as described with reference to FIG. 6. Also, the ion can stop on barrier/spacer layer 1610, AP2 layer 1608, AP1 layer 1604, or at or within AFM layer 904. The location at which ion milling stops defines the various sensor designs. For example, if a full ion milling is performed an AFM having sides that are self aligned with the sides of the sensor stack can be formed, such as the sensor described above with reference to FIG. 5. Moreover, a semi-full ion milling can be performed and stopped within the AP1 layer 1604 to leave AFM layer 904 intact.

Figure 25:
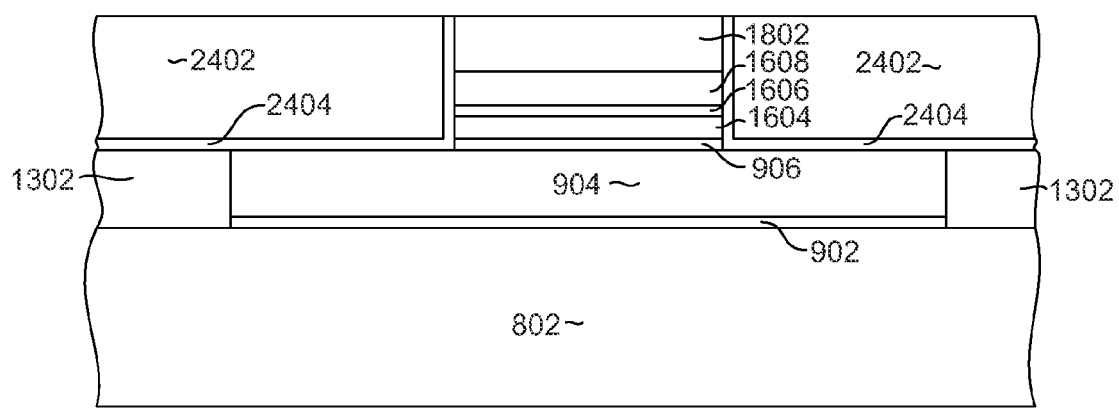
Figure 26:
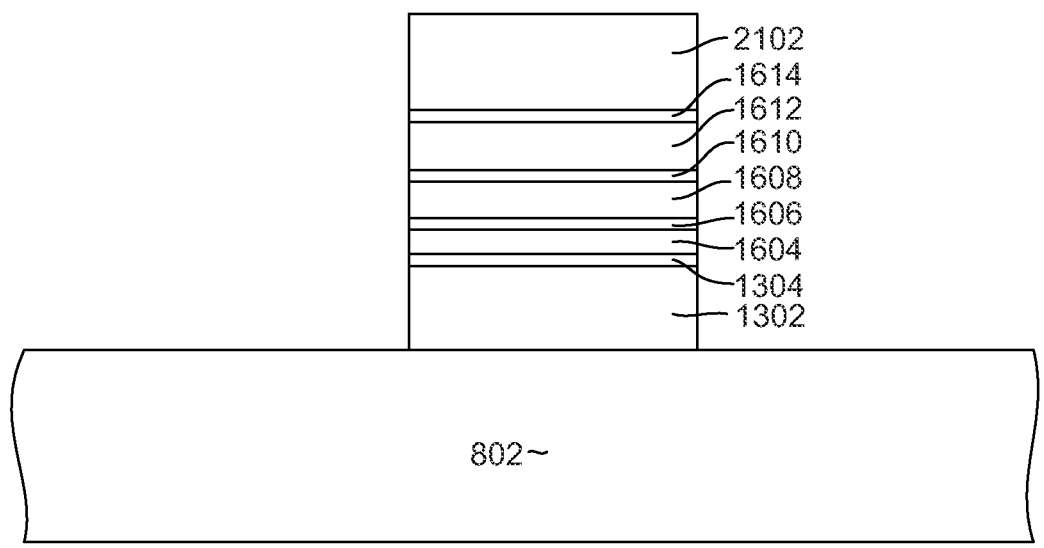
Figure 27:
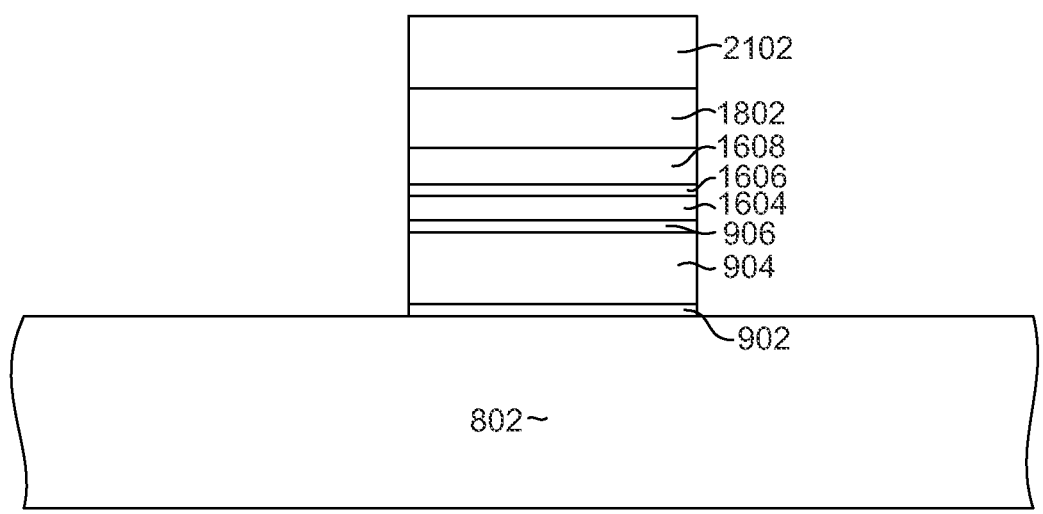
Figure 28:
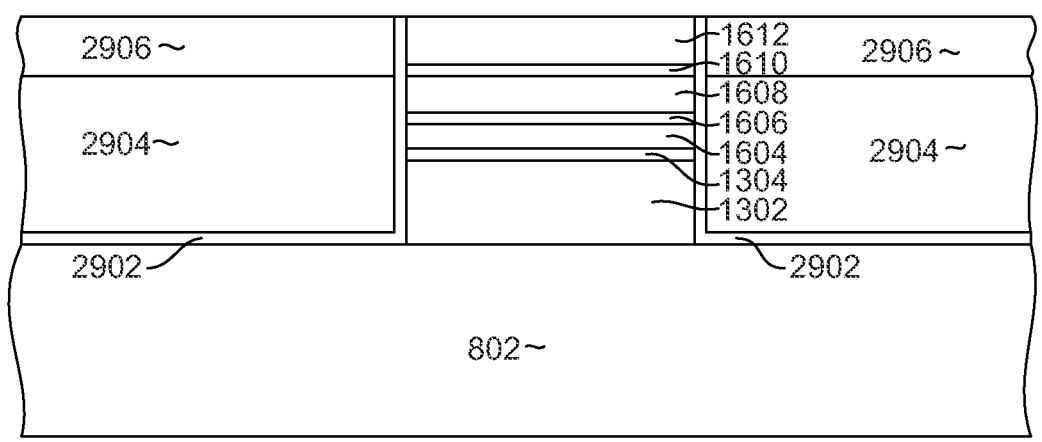
Figure 29:
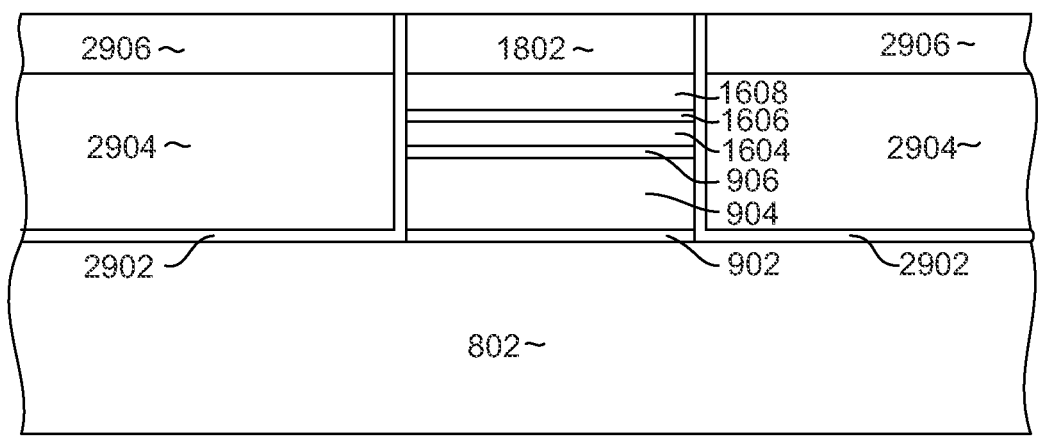

FIGS. 22-26 show a process using a partial ion milling, whereas FIGS. 27-29 illustrate a full milling process. The decision of whether to use a partial or full ion milling depends on the desired shape of the AFM layer 904, for example, whether a rectangular or "U" shape is desired. For a rectangular AFM 904, either partial or full ion milling can be performed. For a rectangular AFM 904 formed by a full ion milling, the ion milling can be extend all of the way through the AFM layer 904 to give shape anisotropy to AP2 1608, AP1 1604 in the front end and back end. For a rectangle AFM using partial ion milling, the ion milling can extend through AP2 1608 and AP1 1604 in the front end while stopping at the layer 906 or the top of AFM 904. For a "U" shaped AFM 904 using full ion milling, etching can extend through the AFM 904 layer to give shape anisotropy to AP2 1608, AP1 1604 in the front end and back end. For "U" shape AFM's using partial ion milting, ion milling can be terminated at the barrier/spacer 1610 or at AP2 1608 to give it shape anisotropy while preserving AP1 1604 and AFM 904, or can be terminated at or below AP1 1604 to give AP2 1608 and AP1 1604 a shape anisotropy while preserving AFM 904. In short, depending on where etching stops various configuration can be achieved to maximize performance and stability.

Figure 22:
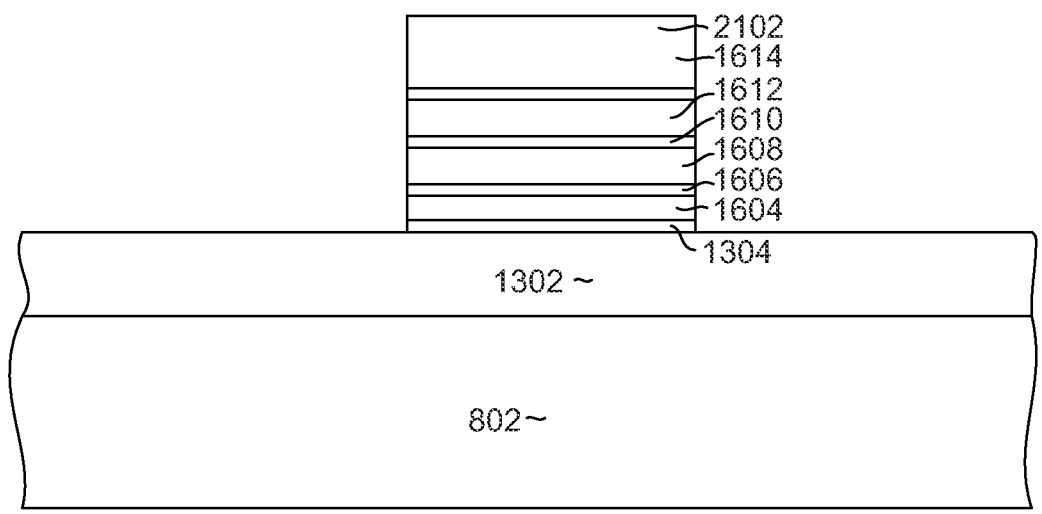
Figure 23:
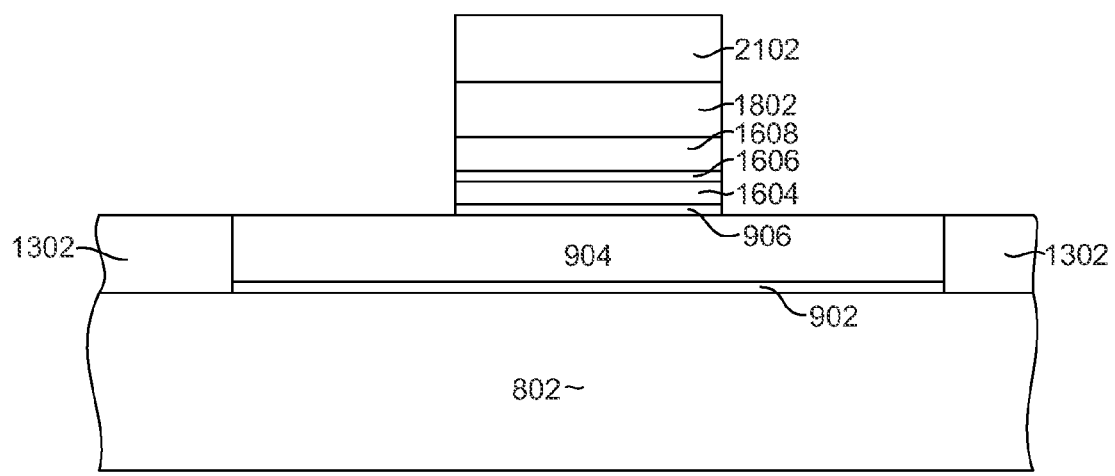

FIG. 22 shows a cross sectional view of the active sensor area as seen from line 22 of FIG. 21, FIG. 23 shows a cross sectional view of the extended pinned layer area at the location of the embedded AFM 904, as taken from line 23-23 of FIG. 21. As shown in FIGS. 22 and 23 a partial ion milling is performed to remove material exposed through the openings in the mask 2102. The ion milling is terminated before the shield refill 1302 (FIG. 22) or embedded AFM 904 (FIG. 23) have been removed. This allows the embedded AFM 904 to extend beyond the sides of the pinned and free layers.

Figure 24:
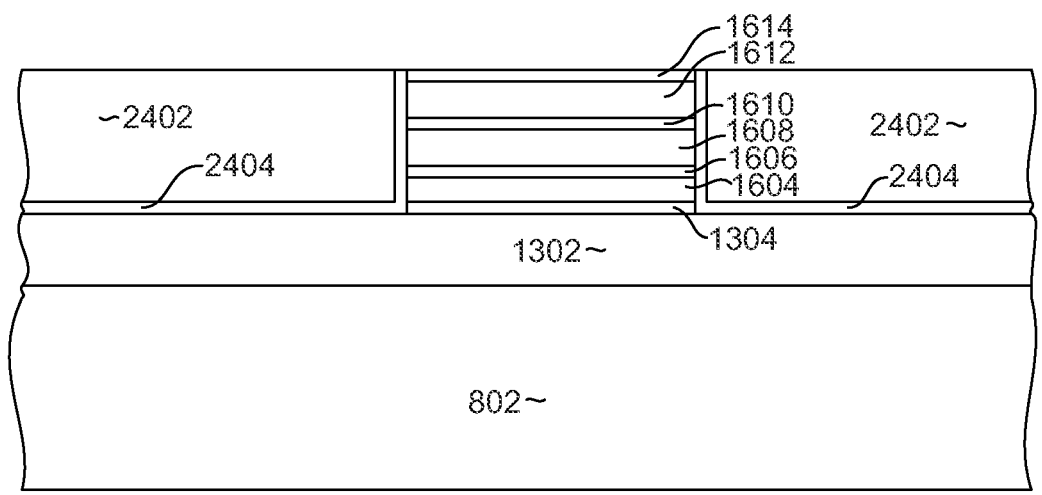

After this partial ion milling is performed, a thin insulation layer 2404 such as alumina, $Si_3N_4$, $Ta_2O_5$, or combinations thereof is deposited by a conformal deposition process such as atomic layer deposition or chemical vapor deposition or ion beam deposition and a magnetic bias layer 2402 is deposited over the insulation layer 2404. A liftoff and planarization process is then performed to remove the mask 2102, some of 2402 layer, and form a flat surface, resulting in a structure as shown in FIGS. 24 and 25, where FIG. 24 shows the active sensor area and FIG. 25 shows the extended pinned layer area. As before, the liftoff and planarization can include depositing a CMP stop layer, performing a mask liftoff such as a chemical liftoff, performing a chemical mechanical polishing to form a planar upper surface and performing a quick reactive ion etching to remove the remaining CMP stop layer.

FIGS. 26 and 27 show a cross section in the active sensor location and extended pinned layer location for a full ion milling process. As seen in FIG. 26, the ion milling is performed until the shield refill 1302 has been removed from the area beyond the sides of the sensor. Similarly, as shown in FIG. 27, the ion milling is performed until the AFM layer 904 is removed as well. This process results in the AFM layer having a width that is self aligned with the sensor stack (similar to the configuration shown in FIG. 5).

With reference now to FIGS. 28 and 29 a thin insulation layer 2902 is deposited by a conformal deposition process such as atomic layer deposition, ion beam deposition, or chemical vapor deposition. Because of the full ion milling, the gap at the side of the sensor stack is deeper than in the partial mill design discussed previously. In order to ensure proper alignment of the bias structure with the free layer 1612, a fill layer 2904 can be deposited. This fill layer 2904 can be a nonmagnetic, conducting or insulating material such as alumina, NiP, Cr, Ru, Ta, $Ta_2O_5$, or combinations thereof and is preferably deposited by a non-conformal deposition process that primarily deposits the material on horizontal surfaces rather than on vertical sides. Then, a magnetic bias layer 2906 is deposited over the fill layer 2904 and the thin insulation layer 2902. As before, a liftoff and planarization process can be performed to remove the mask 2102 (FIG. 27), some magnetic bias layer 2906 and to provide a smooth planar surface. This can include: depositing a CMP stop layer; performing a mask liftoff; performing a mask liftoff; performing a chemical mechanical polishing; and performing a reactive ion etching to remove the CMP stop layer. This results in a structure as shown in FIG. 29.

Figure 30:
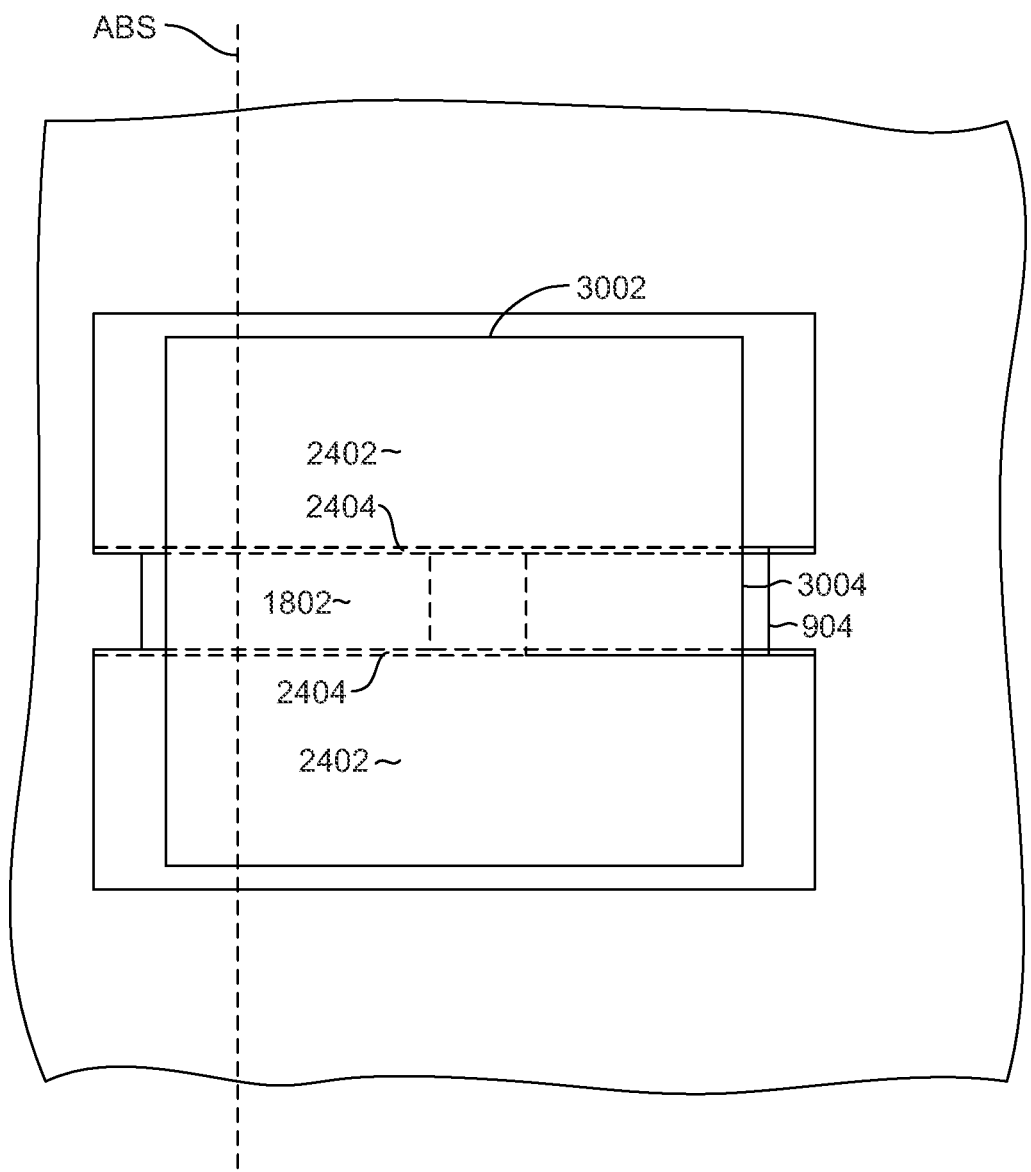

Then, after either of the above processes has been performed (i.e. full milling or partial milling) another masking process is performed to define the stripe height AFM layer 904, and optionally (although not shown) also the width and stripe height of the extended pinned layer 1604, 1606, 1608. FIG. 30 is a top down view showing a mask 3002 formed over the sensor. The mask 3002 has a back edge 3004 that defines the back edge of the AFM layer 904, and (optionally) the pinned layer structure (e.g. layers 1604, 1606, 1608) bias layer 2906. This mask 3002 also has outer edges that define the outer edges of the bias structure 2906. After this mask 3002 has been formed. An ion milling is performed to remove material not protected by the mask 3002. An insulating refill layer (not shown) can be deposited and a liftoff and planarization process can again be performed to remove the mask 3002 and form a planar upper surface.

It should be pointed out that the above described process, where the stripe height of the free layer is first defined by a first masking and milling process and then the sensor width is later defined by a second masking and milling process results in a sensor wherein the magnetic bias layer extends beyond the back edge of the free layer 1612. If design requirements result in a preference for a bias structure that only extends to the same stripe height as the free magnetic layer, the order of operations can be reversed. In this case the track-width would first be defined by a first masking and milling process, and the bias layers would then be deposited. If full ion milling, the magnetic bias layer can consists of a bilayer of lower fill layer 2904 and upper magnetic bias layer 2906 as described above. Or, if a partial ion milling is used, the magnetic bias layer can consist only of magnetic bias layer 2906. The thickness of the magnetic bias layer can be adjusted so that the second ion milling process defines both the free layer and bias structure materials. Then, later, a second masking and ion milling process can be performed to define both the back edge of the free layer 1612 and the back edge of the bias structure 2906 (or 2402 in FIGS. 24 and 25). In this case the back edge of the bias structure would be self aligned with the back edge of the free layer.

Figure 31:
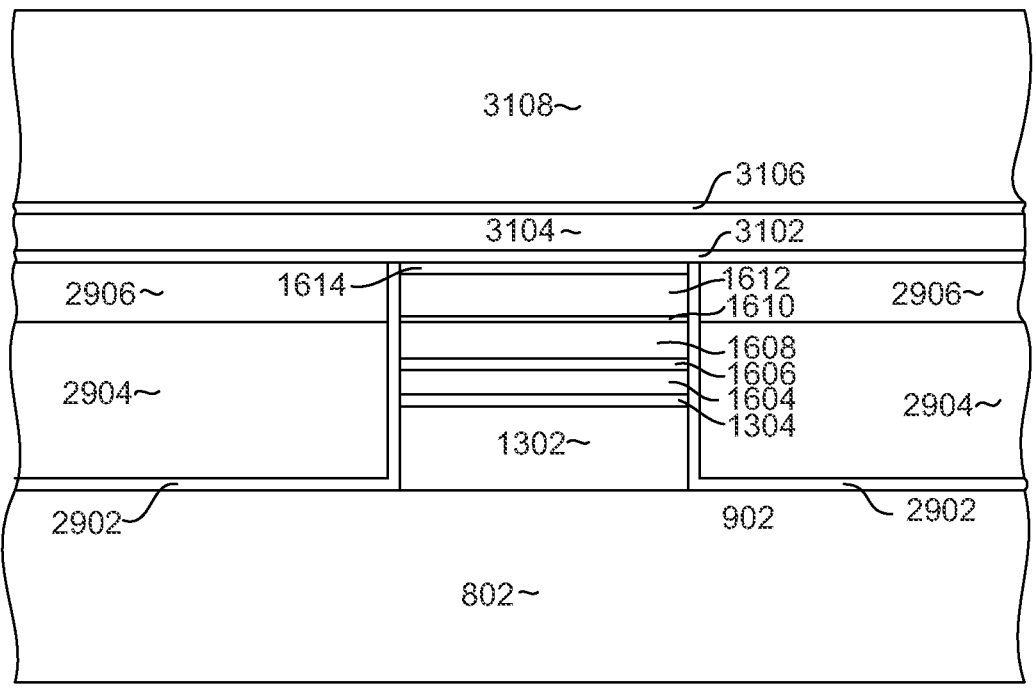

FIG. 31 shows a cross sectional view of a plane parallel with the air bearing surface in the active region of the sensor. The bias structure 2906 (or 2402 of FIG. 24) can be a hard magnetic bias structure (constructed of a magnetic material having a high magnetic coercivity) or could be a soft magnetic bias structure (constructed of a material having a low magnetic coercivity). In one embodiment shown in FIG. 31, the bias structure 2906 is a soft magnetic material such as NiFe, NiFeCr, CoFe or a combination thereof. An upper magnetic shield 3108 is formed over the sensor. A layer of antiferromagnetic material 3104 is deposited over the sensor and exchange coupled with a layer of magnetic material 3102. The exchange coupling between the AFM layer 3104 and the magnetic material 3102 can be used to align the magnetization of the magnetic layer 3102 in a desired direction parallel with the ABS. The magnetic material 3102 is magnetically coupled with the soft bias structure 2906 in such a manner as to set the magnetization of the bias layers 2906. A non-magnetic decoupling layer 3106 can be provided between the AFM layer 3104 and the upper shield 3108 to prevent the shield from being magnetically pinned.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetoresistive sensor, comprising:
   first and second magnetic shields;
   a sensor stack sandwiched between the first and second magnetic shields, the sensor stack including a pinned layer structure, a free layer structure and a non-magnetic layer sandwiched between the pinned layer structure and the free layer structure, the free layer structure extending to a first stripe height measured from an air bearing surface and the pinned layer structure extending to a second stripe height measured from the air bearing surface, the second stripe height being greater than the first stripe height; and
   a layer of anti-ferromagnetic material, embedded in the first magnetic shield and exchange coupled with a portion of the pinned layer structure;
   wherein the free layer structure defines an active sensor area and wherein the first shield includes a magnetic base layer and a magnetic fill layer formed over the magnetic base layer, the magnetic fill layer being located in the active sensor area; the layer of anti-ferromagnetic material having a contacting interface with the magnetic fill layer, the interface being located substantially parallel to the air bearing surface; wherein the free layer structure has first and second sides, the distance between which defines a free layer structure width, and wherein the layer of anti-ferromagnetic material has a width that is greater than the free layer structure width.

2. The magnetoresistive sensor as in claim 1 wherein the free layer structure defines an active area of the sensor and wherein the layer of anti-ferromagnetic material is located outside of the active area of the sensor.

3. The magnetoresistive sensor as in claim 2, wherein:
   the layer of anti-ferromagnetic material has a front edge located at a distance X from the air bearing surface;
   the distance X is greater than the first stripe height, and
   the magnetic fill layer extends from the air bearing surface to the distance X.

4. The magnetoresistive sensor as in claim 1 wherein the layer of anti-ferromagnetic material is locate outside of the active area of the sensor.

5. The magnetoresistive sensor as in claim 1, wherein the free layer structure has first and second sides, and wherein the layer of anti-ferromagnetic material has first and second sides that are aligned with the first and second sides of the free layer structure.

6. The magnetoresistive sensor as in claim 1 wherein the free layer structure has first and second laterally opposed sides and wherein the distance between the first and second sides and the distance between the air bearing surface and the first stripe height defines an active sensor area, and wherein the layer of anti-ferromagnetic material is located outside of the active sensor area.

7. The magnetoresistive sensor as in claim 6 wherein the layer of anti-ferromagnetic material extends toward the air bearing surface in an area beyond the first and second sides of the free layer structure and outside of the active sensor area.

8. The magnetoresistive sensor as in claim 1 further comprising a magnetic pinned sub-layer that is exchange coupled with the layer of anti-ferromagnetic material and that contacts a magnetic layer of the pinned layer structure.

9. A magnetoresistive sensor, comprising:
   first and second magnetic shields extending to an air bearing surface;
   a sensor stack sandwiched between the first and second magnetic shields, the sensor stack including a pinned layer structure, a free layer structure and a non-magnetic layer sandwiched between the pinned layer structure and the free layer structure; and
   a layer of anti-ferromagnetic material embedded within the first magnetic shield and removed from the air bearing surface; wherein
   the distance between the first and second magnetic shields at the air bearing surface defines a read gap, and
   the layer of anti-ferromagnetic material being embedded within the first magnetic shield and removed from the air bearing surface does not contribute to the read gap;
   wherein the free layer structure defines an active sensor area and wherein the first shield includes a magnetic base layer and a magnetic fill layer formed over the magnetic base layer, the magnetic fill layer being located in the active sensor area; the layer of anti-ferromagnetic material having a contacting interface with the magnetic fill layer, the interface being located substantially parallel to the air bearing surface; wherein the free layer structure has first and second sides, the distance between which defines a free layer structure width, and wherein the layer of anti-ferromagnetic material has a width that is greater than the free layer structure width.

10. A magnetic data recording system, comprising:
    a housing;
    a magnetic media mounted within the housing;
    an actuator mounted within the housing;
    a slider connected with the actuator for movement adjacent to the magnetic media; and
    a magnetic sensor formed on the slider, the magnetic sensor further comprising:
    first and second magnetic shields;
    a sensor stack sandwiched between the first and second magnetic shields, the sensor stack including a pinned layer structure, a free layer structure and a non-magnetic layer sandwiched between the pinned layer structure and the free layer structure, the free layer structure extending to a first stripe height measured from an air bearing surface and the pinned layer structure extending to a second stripe height measured from the air bearing surface, the second stripe height being greater than the first stripe height; and
    a layer of anti-ferromagnetic material, embedded in the first magnetic shield and exchange coupled with a portion of the pinned layer structure;
    wherein the free layer structure defines an active sensor area and wherein the first shield includes a magnetic base layer and a magnetic fill layer formed over the magnetic base layer, the magnetic fill layer being located in the active sensor area; the layer of anti-ferromagnetic material having a contacting interface with the magnetic fill layer, the interface being located substantially parallel to the air bearing surface; wherein the free layer structure has first and second sides, the distance between which defines a free layer structure width, and wherein the layer of anti-ferromagnetic material has a width that is greater than the free layer structure width.

11. The magnetic data recording system as in claim 10 wherein the free layer structure defines an active area of the sensor and wherein the layer of anti-ferromagnetic material is located outside of the active area of the sensor.

12. The magnetic data recording system as in claim 10, wherein:
    the layer of anti-ferromagnetic material has a front edge located at a distance X from the air bearing surface;
    the distance X is greater than the first stripe height, and
    the magnetic fill layer extends from the air bearing surface the distance X.

* * * * *